United States Patent [19]
Bruck et al.

[11] Patent Number: 6,008,836
[45] Date of Patent: Dec. 28, 1999

[54] METHOD AND APPARATUS FOR ADJUSTING TELEVISION DISPLAY CONTROL USING A BROWSER

[75] Inventors: Timo A. Bruck, Mountain View; Bruce A. Leak, Palo Alto, both of Calif.; Steven C. Wasserman, Wellesley, Mass.

[73] Assignee: WebTV Networks, Inc., Mountain View, Calif.

[21] Appl. No.: 08/755,233

[22] Filed: Nov. 22, 1996

Related U.S. Application Data

[63] Continuation-in-part of application No. 08/660,088, Jun. 3, 1996.

[51] Int. Cl.$^6$ .................................................. H04N 7/10
[52] U.S. Cl. ............................. 348/6; 348/10; 348/13; 345/327; 345/338
[58] Field of Search ................................ 348/189, 190, 348/191, 177, 10, 11, 678, 687; 455/62, 63; 395/200.33, 200.47, 200.51, 200.52; 434/307 R, 118, 323; 345/338

[56] References Cited

U.S. PATENT DOCUMENTS

| | | | |
|---|---|---|---|
| 4,513,318 | 4/1985 | Wilensky et al. | 358/139 |
| 4,772,206 | 9/1988 | Kerr et al. | 434/118 |
| 5,212,546 | 5/1993 | Arazi et al. | 358/80 |
| 5,218,671 | 6/1993 | Liao et al. | 395/131 |
| 5,247,358 | 9/1993 | Richards | 348/189 |
| 5,270,821 | 12/1993 | Samuels | 358/188 |
| 5,298,993 | 3/1994 | Edgar et al. | 348/180 |
| 5,318,450 | 6/1994 | Carver | 434/336 |
| 5,325,423 | 6/1994 | Lewis . | |
| 5,381,349 | 1/1995 | Winter et al. | 348/179 |
| 5,488,411 | 1/1996 | Lewis . | |
| 5,532,753 | 7/1996 | Buchner et al. | 348/569 |
| 5,535,323 | 7/1996 | Miller et al. | 395/155 |
| 5,535,422 | 7/1996 | Chiang et al. | 345/338 |
| 5,538,255 | 7/1996 | Barker . | |
| 5,558,339 | 9/1996 | Perlman . | |
| 5,564,001 | 10/1996 | Lewis . | |
| 5,565,897 | 10/1996 | Kikinis et al. | 345/213 |
| 5,586,257 | 12/1996 | Perlman . | |
| 5,612,730 | 3/1997 | Lewis . | |
| 5,638,117 | 6/1997 | Engeldrum | 348/179 |
| 5,671,011 | 9/1997 | Kim | 348/190 |
| 5,701,417 | 12/1997 | Lewis et al. | 395/200.52 |
| 5,703,661 | 12/1997 | Wu | 348/686 |
| 5,727,156 | 3/1998 | Herr-Hoyman et al. | 395/200.49 |
| 5,781,247 | 7/1998 | Wehmeyer et al. | 348/569 |
| 5,790,753 | 8/1998 | Krishnamoorthy et al. | 395/200.33 |

OTHER PUBLICATIONS (Jim Mallory, Palm Sized Camera Grabs Images for the Web, Newsbytes News Network, p. 1; Product Introduction, Parameters List Sep. 6, 1996.
(Annette Burke, Micro Touch Introduces Flat Panel Display Designed Specifically For Touch Input, Business Wire, p. 2, Apr. 23, 1996.
(Marc R. Brown, Using Netscape 2, The Most Complete Reference, pp. 449–450, 687–688 and 703–713), 1995.

*Primary Examiner*—Andrew I. Faile
*Assistant Examiner*—Reuben M. Brown
*Attorney, Agent, or Firm*—Workman, Nydegger & Seeley

[57] ABSTRACT

Web browser software implemented in a set-top box as part of a client system communicating over the Internet with one or more servers allows a user to adjust the picture quality of a monitor through World-Wide Web pages displayed on the monitor. The web browser software provides picture adjustment screens which contain instructions on how to adjust the monitor controls to optimize the picture quality. The picture adjustment screens also contain test patterns which provide reference and visual feedback of the monitor adjustment. The user adjusts the picture quality of the monitor using the monitor display controls and the test patterns provided on the picture adjustment screens. Picture adjustment screens are provided for display characteristics such as picture brightness, contrast, sharpness, color, and hue.

22 Claims, 21 Drawing Sheets

METHOD AND APPARATUS FOR ADJUSTING TELEVISION DISPLAY CONTROL USING A BROWSER

The present application is a continuation-in-part of the following U.S. Patent application: U.S. Patent application entitled, "Web Browser Allowing Navigation Between Hypertext Objects Using Remote Control," having application Ser. No. 08/660,088, and filed on Jun. 3, 1996; which is assigned to the assignee of the present invention.

FIELD OF THE INVENTION

The present invention relates generally to the field of user interfaces for web browsers, and more particularly to a method of adjusting the picture quality of web page images displayed on a display device.

BACKGROUND OF THE INVENTION

The Internet is rapidly becoming an important source of information and electronic communication for users of personal computers in homes and businesses. Much of the information on the Internet is available on a network called the World-Wide Web. The World-Wide Web is a collection of formatted hypertext pages located on numerous computers around the world that are logically connected by the Internet. Until recently, access to the Internet and World-Wide Web from the home environment has been limited to users of personal or network computers. Recent advances in network technology, however, have enabled access to the Internet and the World-Wide Web through a standard television set as an alternative to the personal computer.

Information from the World-Wide Web is displayed in the form of "web pages" which are accessed by user interface programs called "web browsers". Much of the information from the World-Wide Web is graphical in nature, and a typical web page can include text, graphic images, and animation sequences. Because of this graphic content, the proper display of such images on a monitor is fundamental to the utility of web pages. The quality of a web page image displayed on a monitor is determined largely by the display capability of the web browser. Browsers may employ extensive processing and filtering circuitry to ensure high picture quality. However, the display settings on the user monitor have a significant impact on picture quality as well.

Unlike most computer monitors, television sets are designed to receive broadcast signals from various sources. Because of the differing quality levels of these signals, the user must often tune the picture quality to obtain a visually correct image. Most televisions provide user settable controls for the setting of picture characteristics such as contrast, brightness, sharpness, color, and hue. Such controls are typically available as knobs or sliders which the user physically turns or slides, or as on-screen controls which the user sets through buttons on the front panel of the television or on a remote control unit. As with broadcast or cable signals, the proper display of web pages on a television set requires that the television display controls be set to their optimum viewing settings. A high quality, well filtered image sent from a browser may well be out of focus, too dim or of too high a contrast simply because the television picture controls are set improperly for the web page being viewed. Because display controls on a client monitor are manipulable only by the user, Internet browsers have little control over the display characteristics at the ultimate user site. Instead, it is up to the user to set his television display controls accordingly.

One problem associated with prior art web browsers is that users are not alerted or instructed to properly set their monitor display settings. The viewer of a poor quality image would simply attribute the poor quality to the browser filter or transmission line, without realizing that he could enhance the picture quality by properly adjusting his monitor. This problem is not as acute when the display device is a computer monitor, since the use of well-established industry standards allows the production of video signals that are optimized for these monitors, resulting in picture quality that is typically acceptable without extensive display tuning. Indeed, typical computer displays provide no picture quality control, or limit control only to brightness and contrast. However, as televisions and other monitors are used to display web pages, control over all display characteristics becomes increasingly important. Therefore users should be instructed to tune their television displays accordingly.

Another disadvantage of prior art web browsers is that they do not facilitate user tuning of monitor display characteristics. Users may not know how to use the knobs or on-screen menus to tune a particular display characteristic. It would thus be advantageous to provide a web browser which instructs the user how to tune his display controls to optimize the display quality of web pages accessed by the web browser.

Yet another problem associated with prior art web browsers is that they do not provide a reference standard against which to tune the display controls of a monitor. Presently, a user might rely on a familiar web page image to determine whether a web page image is out of focus, too dim, or improperly color shifted. Unless the user were aware of a particular reference standard against which to tune his television display, he would have little way of knowing whether his television display controls are set correctly. Thus, the use of a familiar web page to tune the picture quality of a monitor requires knowledge of a familiar web page, and a process of trial and error to obtain the proper settings. Another shortcoming of this method is that controls set for a particular web page may not be optimum for other web pages. For example, the user of a prior art web browser would typically raise or lower the brightness of his monitor if an image in a particular web page appeared too dim or too bright, but would not be able to easily determine whether those settings are adequate for all web images. It would thus be advantageous to provide a reference standard against which the display controls could be conveniently and accurately calibrated for all possible images.

Based on the foregoing, it is desirable to provide a web browser system in which the control of monitor display characteristics is facilitated, and a reference standard is readily provided such that the user can easily set the display settings for the optimum viewing position. What is thus desired is a method for providing the user a convenient way to tune the display characteristics of his display monitor to optimize the display for all web pages displayed on the monitor.

SUMMARY OF THE INVENTION

The present invention discloses a method and apparatus for easily and accurately tuning the picture quality of web pages displayed on a display device in a client system in communication with one or more server systems.

According to one aspect of the present invention, a picture adjustment screen is displayed on the display device. The picture adjustment screen provides access to control screens which prompt the user to manipulate the picture quality controls on the client display device. The control screens also contain instructions which guide the user through the process of properly adjusting the picture quality controls. The control screens further contain test patterns or reference images which allow the user to accurately calibrate the picture characteristics for which controls are available.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which.

DETAILED DESCRIPTION

A method and apparatus for tuning the display characteristics of a display device using a web browser are described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

As will be described in greater detail below, the present invention includes steps for implementing a Web browser that allows a user to set the display controls on his display device to display Web pages obtained from the World-Wide Web (hereinafter "Web") or built-in to the web browser or service. The user is not required to identify or locate control instructions or reference patterns; rather, the system of the present invention performs these functions for the user.

In one embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The present invention is included in a system known as WebTV™, which uses a standard television set as a display device for browsing the Web and which connects to a conventional network, such as the Internet, using standard telephone, Integrated Services Digital Network (ISDN), or similar communication lines. In accordance with the present invention, a user of a WebTV™ client system can utilize WebTV™ network services provided by one or more remote WebTV™ servers. The WebTV™ network services can be used in conjunction with software running in a WebTV™ client system to browse the Web, send electronic mail, and to make use of the Internet in various other ways.

Figure 1A:
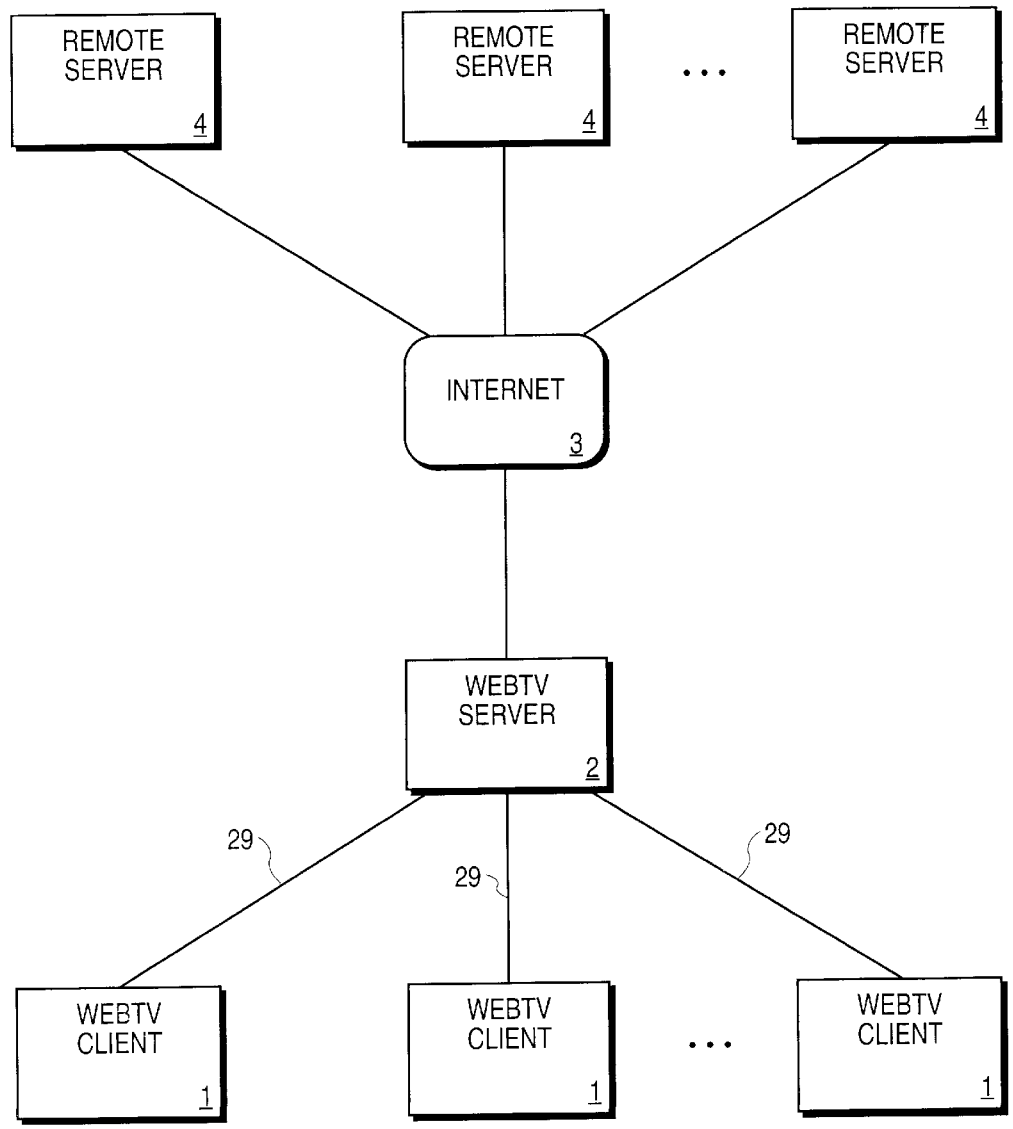
FIG. 1A illustrates several WebTV™ client systems connected to a WebTV™ server system.

FIG. 1A illustrates a basic configuration of the WebTV™ network according to one embodiment. A number of WebTV™ clients 1 are coupled to a modem pool 2 via direct-dial, bi-directional data connections 29, which may be telephone, ISDN, or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks.

Client System Architecture

Figure 1B:
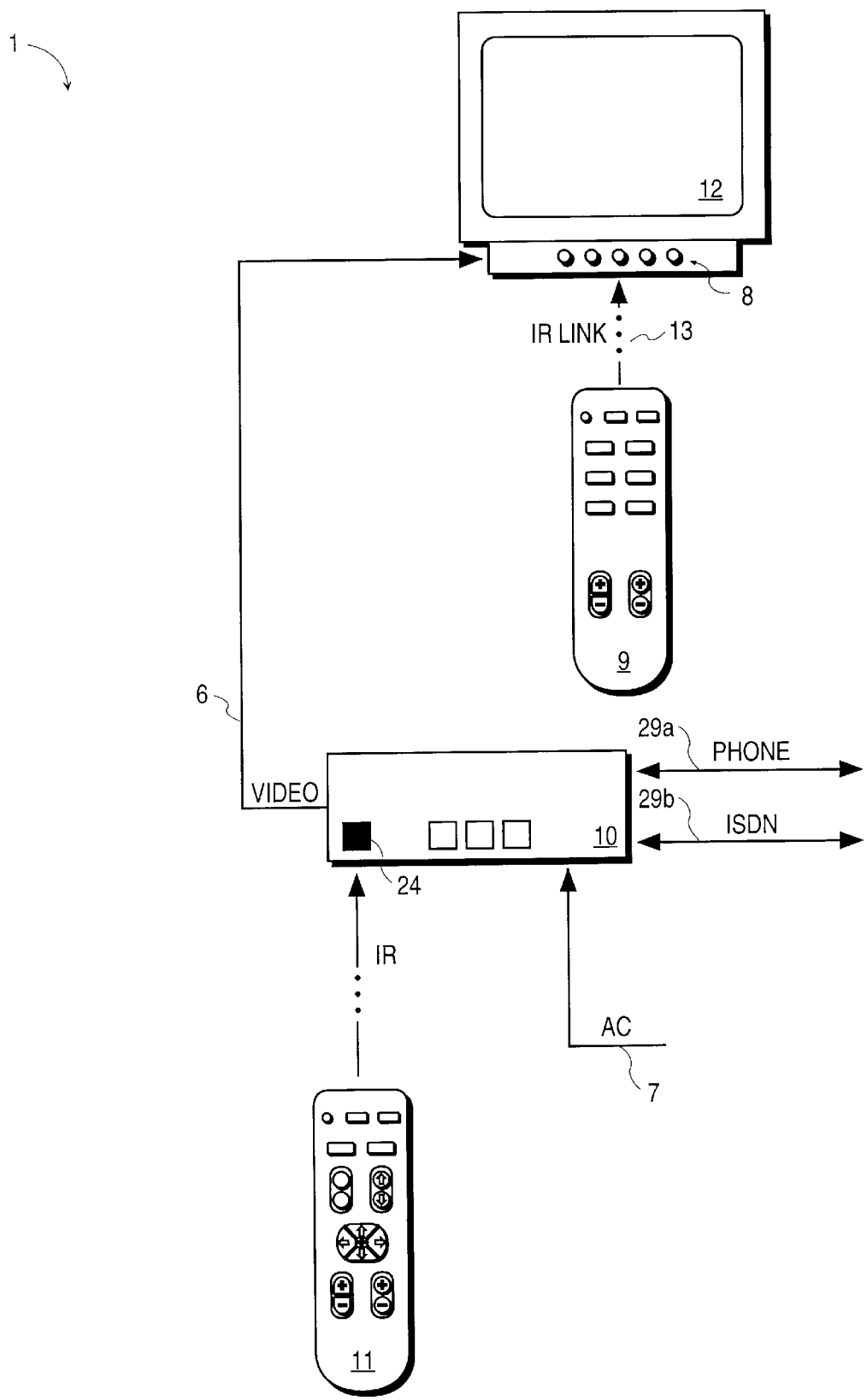
FIG. 1B illustrates a WebTV™ client system.

FIG. 1B illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send e-mail, and otherwise access the Internet.

The WebTV™ client 1 uses the television set 12 as a display device. Television set 12 contains front panel knobs 8 which provide for user control of several operational parameters such as power, picture quality, and picture source, among others. A remote control unit 9 may also be available to control the operation of television 12. Television 12 receives commands from remote control 9 via an infrared (IR) communication link. In alternative embodiments, the link 13 between the remote control unit 9 and the television 12 may be radio frequency (RF) or any equivalent mode of transmission. Certain functions invoked by the remote control unit 9 may cause the display of on-screen menus on the screen of television 12, and allow the control of such menus via cursor buttons on the remote control unit 9.

The WebTV™ box 10 is coupled to the television set 12 by a video link 6. The video link 6 is an RF, S-video, composite video, or other equivalent form of video link. The communication link 29 between the WebTV™ box 10 and the server 5 is either a telephone connection 29a or an ISDN connection 29b. The WebTV™ box 10 receives AC (alternating current) power through an AC power line 7.

Remote control 11 is operated by the user in order to control the WebTV™ client 1 in browsing the Web, sending e-mail, and performing other Internet related functions. The WebTV™ box 10 receives commands from remote control 11 via an infrared (IR) communication link. In alternative embodiments, the link between the remote control 11 and the WebTV™ box 10 may be RF or any equivalent mode of transmission, and remote control 11 may be configured to control television set 12 through link 13.

The WebTV™ box 10 includes application software which, when executed by a processor in the box 10, provides the user with a graphical user interface by which the user can access the WebTV™ network services and browse the Web. The application software is automatically executed upon application of power to the WebTV™ box 10.

Figure 1C:
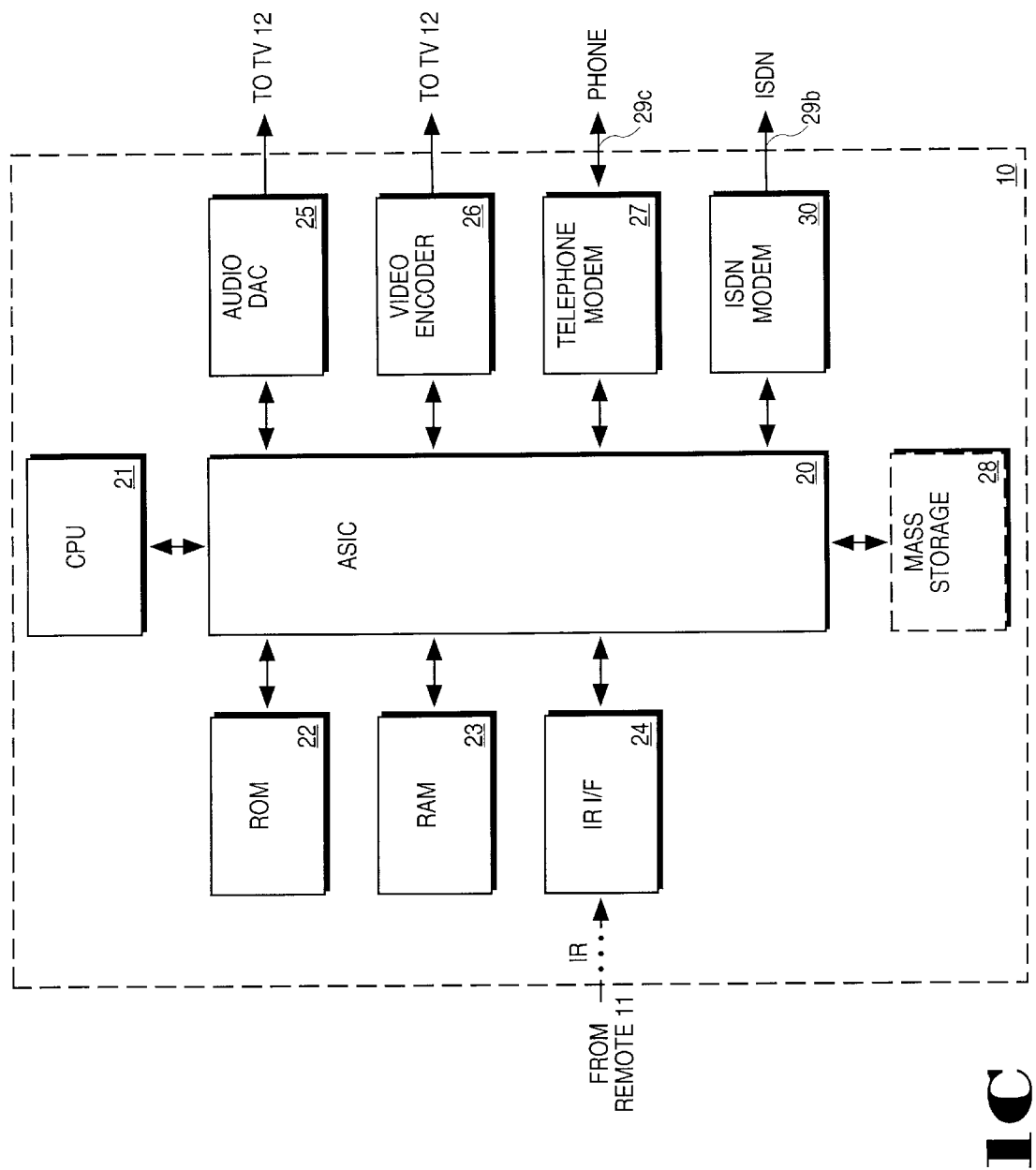
FIG. 1C illustrates a block diagram of an electronics unit used to implement a Web browser according to one embodiment of the present invention.

FIG. 1C is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Application Software

Figure 2A:
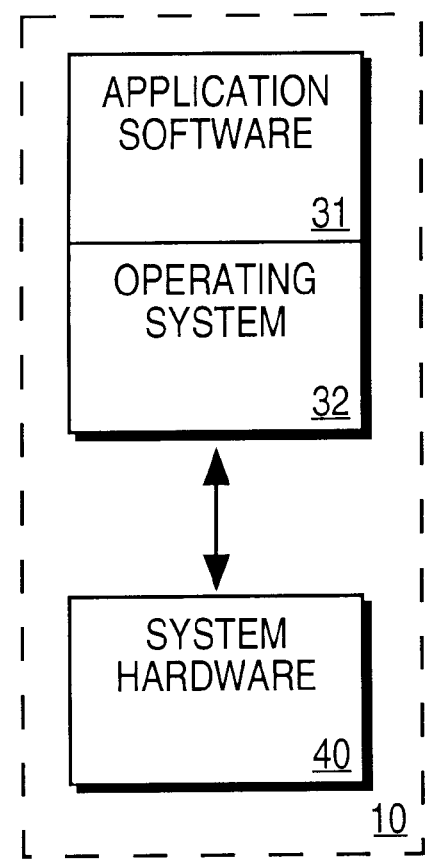
FIG. 2A illustrates a block diagram of the Web Browser application software.

As mentioned above, the WebTV™ box 10 includes application software including a Web browser. Referring now to FIG. 2A, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 1C).

In the preferred embodiment, the application software 31 and OS software 32 are stored in ROM 22. It will be recognized, however, that either or both of application software 31 and OS software 32 can be stored on any suitable storage medium, including magnetic or optical storage devices.

Figure 2B:
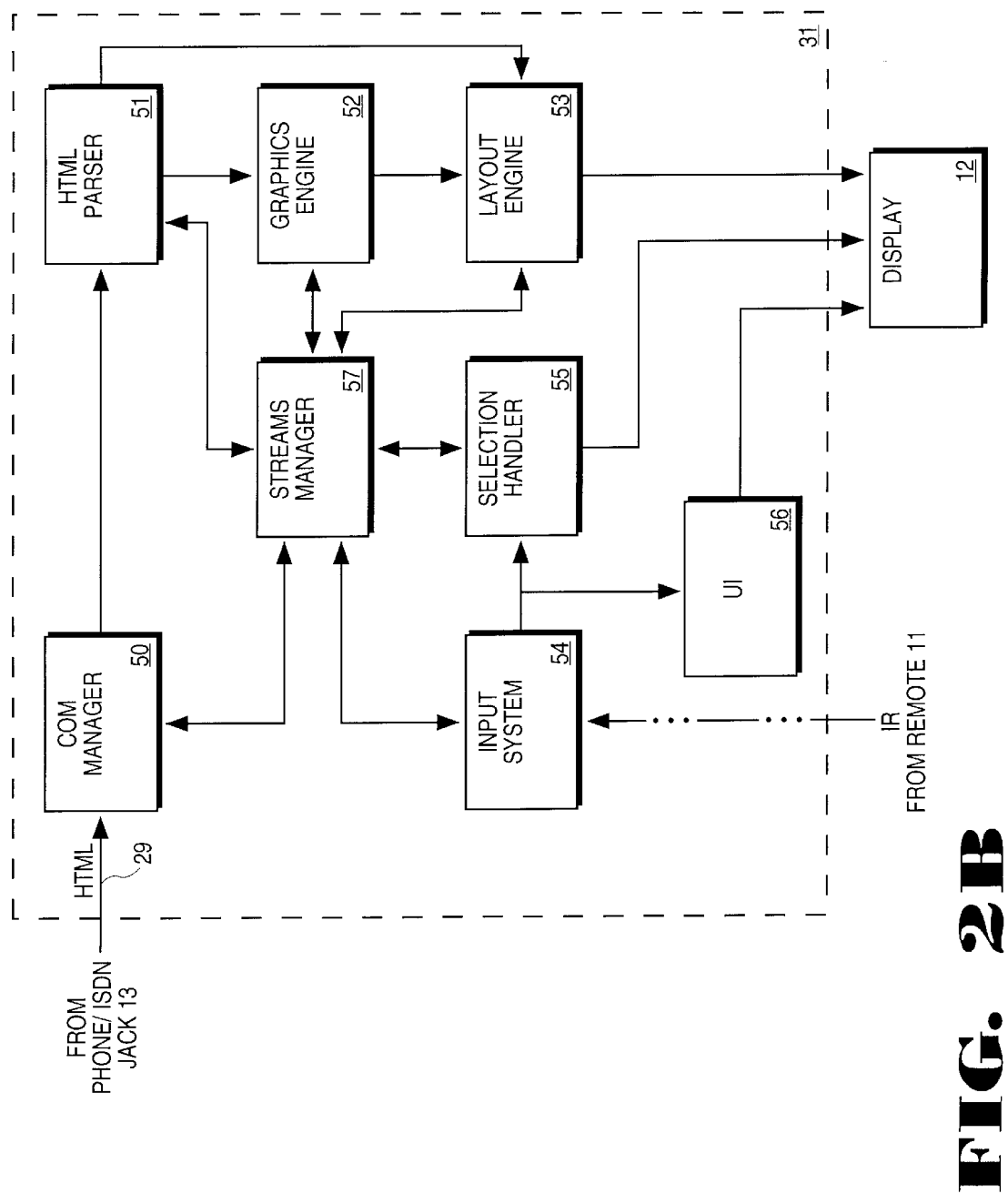
FIG. 2B illustrates the functional relationship between hardware and software in the client processing system of FIG. 1C.

The Web browser functions of the present invention are implemented by application software 31. FIG. 2B illustrates the functional relationships between the various components of application software 31. Application software 31 includes a communications manager 50, an HTML (Hypertext Markup Language) parser 51, a graphics engine 52, a layout engine 53, an input system 54, a user interface 56, a selection handler 55, and a streams manager 57. The client system receives Web pages over network connection 29 in the form of HTML documents. Streams manager 57 controls and coordinates movement of data throughout the system.

Each HTML document is initially input to communications manager 50. Communications manager 50 performs functions necessary to receive an HTML document, over the network connection 29 including handling high-level communications protocols, such as HTTP (Hypertext Transport Protocol), TCP/IP (Transmission Control Protocol/Internet Protocol), etc. A received HTML document is provided by communications manager 50 to HTML parser 51. HTML parser 51 converts HTML page descriptions to a displayable format for the client system.

As is well known, an HTML document may contain text and/or refer to images. Further, an HTML document may include one or more "hypertext anchors," which are displayable objects that provide a link to another Web page. Hypertext anchors are also sometimes referred to as "hot links" or "hot spots". Each hypertext anchor is associated with a particular URL (Uniform Resource Locator) or other logical address representing the location of the Web page to which the anchor provides a link. Image information, such as JPEG or GIF image information, are provided by HTML parser 51 to layout engine 53 via a graphics engine 52, which is responsible for measuring and drawing images.

In the course of browsing through a displayed Web page or between different Web pages, a user activates buttons on remote control 11, which, in response, transmits IR signals that are received by the WebTV™ box 10. Input system 54 records these inputs and provides them to selection handler 55 and user interface 56. In addition, input system 54 can handle input queuing and processing of inputs from various other input devices, such as a standard or IR keyboard. Other aspects of the Web browser which are visible to the user are provided by user interface 56 based on signals received from input system 54.

Setup and Screen Control

Figure 3:
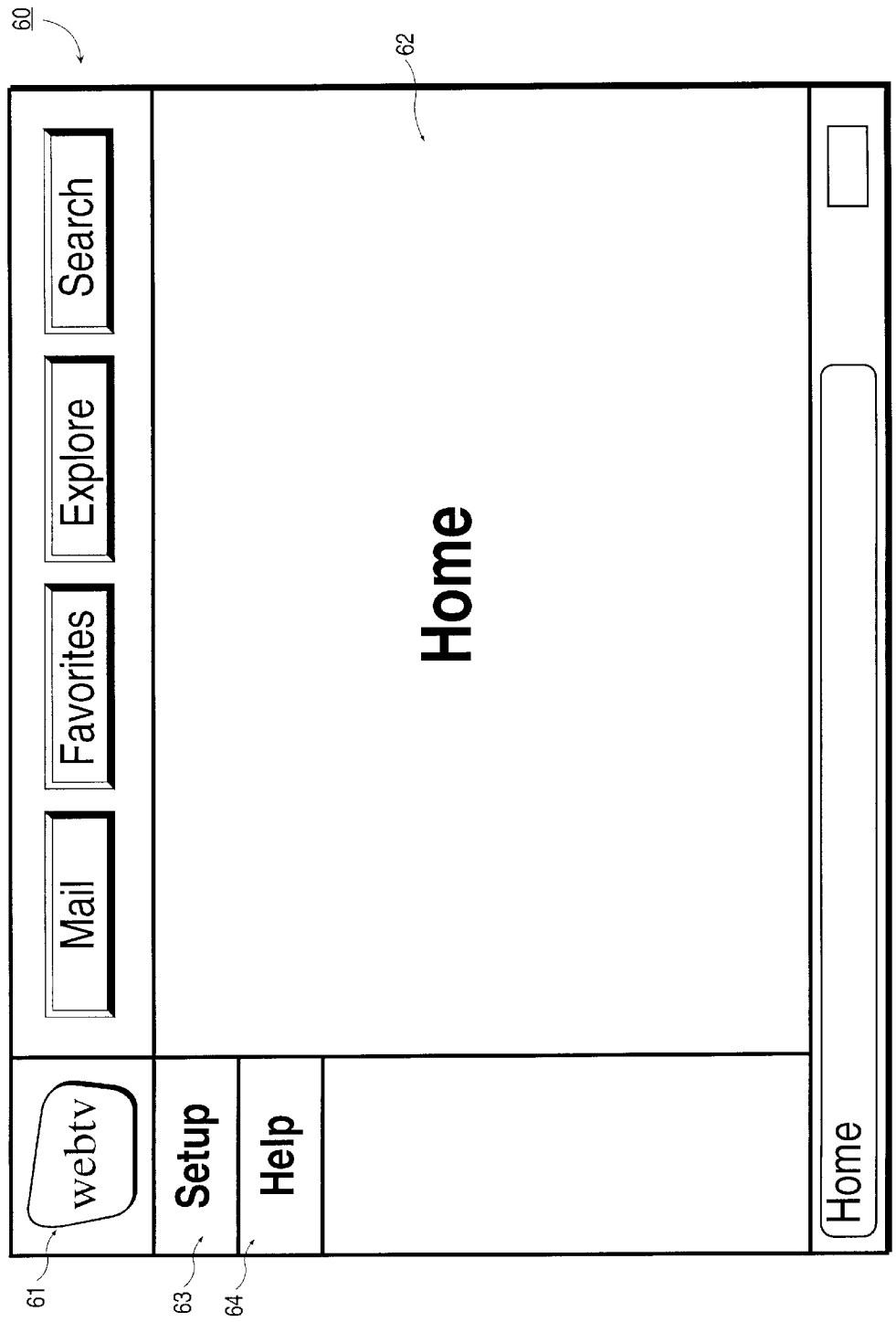
FIG. 3 illustrates the Home Page of the WebTV™ web browser program.

FIG. 3 illustrates the Home page of the WebTV™ network service. The Home page may be accessed and displayed by depressing the appropriate button on the remote control 11 or by typing the typing the appropriate URL address for the WebTV™ Home page to input system 54.

The WebTV™ Home page 60 includes the WebTV™ logo 61, a home graphics and text field 62, and hypertext anchors 63 and 64. Hypertext anchor 63 is a link to the Setup page for the WebTV™ system. Hypertext anchor 64 is a link to the Instruction page for the WebTV™ system.

Figure 4A:
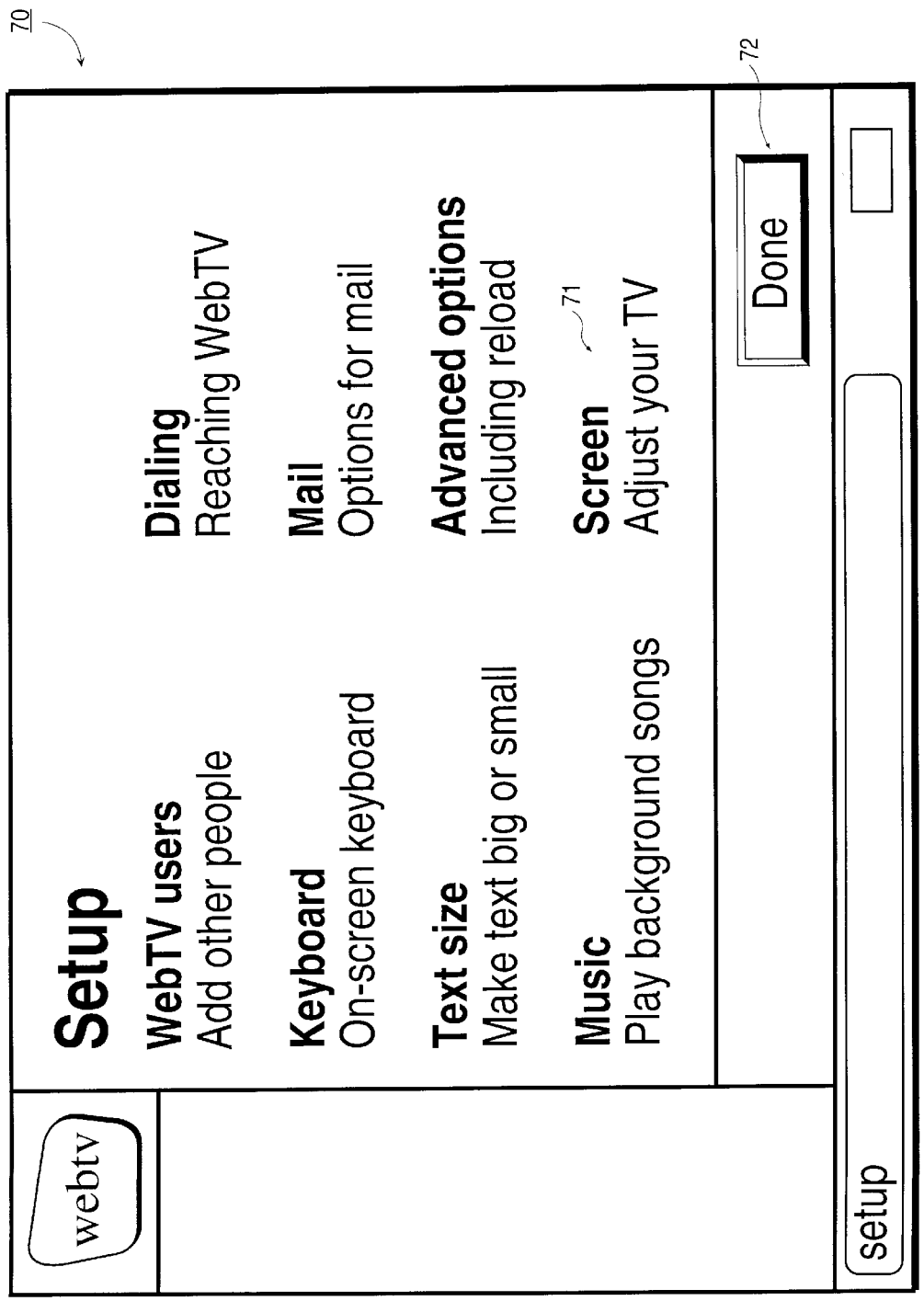
FIG. 4A illustrates the Setup screen of the WebTV™ web browser program.
Figure 4B:
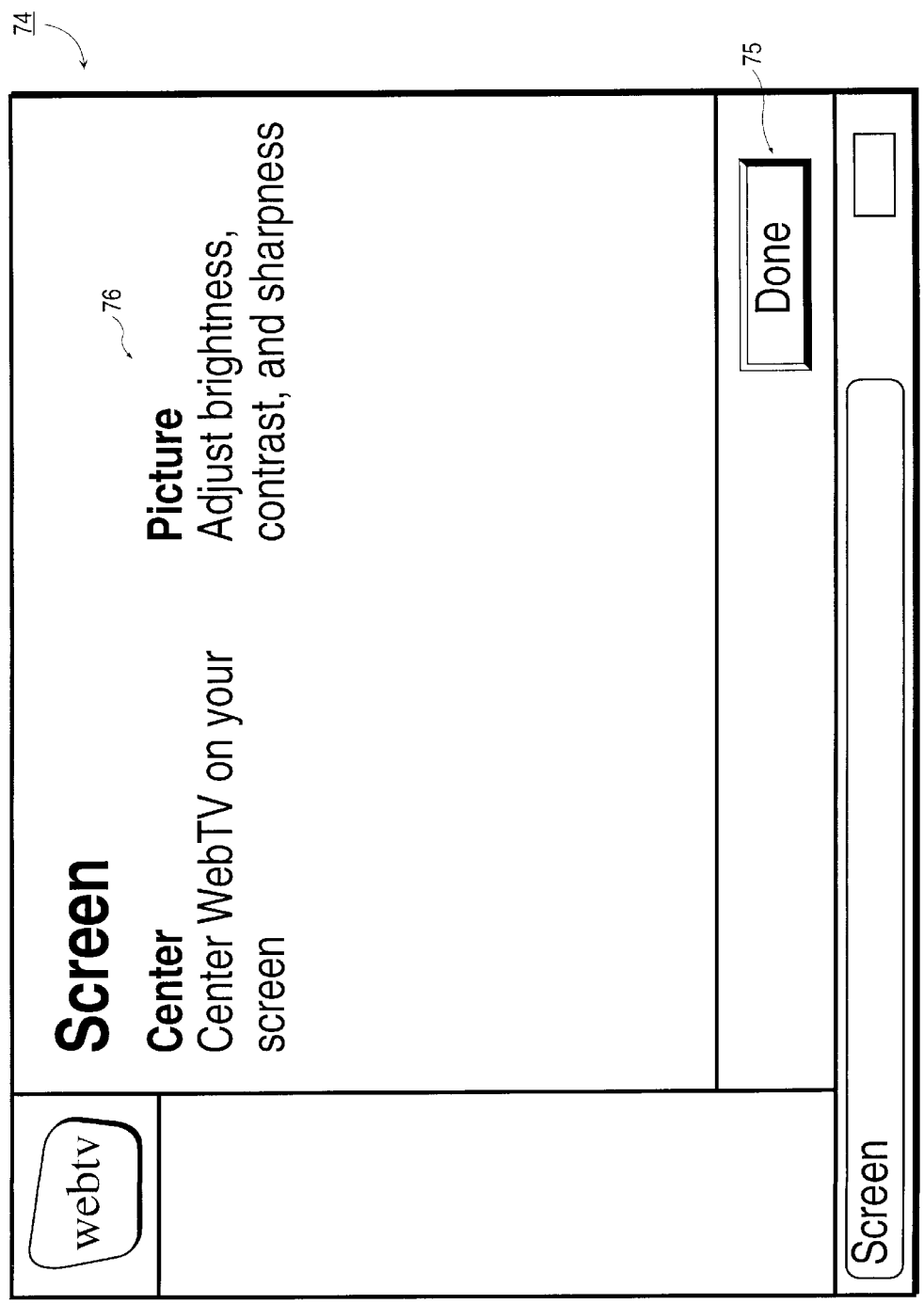
FIG. 4B illustrates the Screen Control screen of the WebTV™ web browser program.

If the user selects the Setup hypertext anchor 63, the WebTV™ Setup screen is displayed. The WebTV™ Setup 70 screen is illustrated in FIG. 4A, and includes hypertext anchors 71 and 72. Hypertext anchor 71 is a link to the Screen Control screen, and hypertext anchor 72 labeled 'Done' is a link back to the Home page 60 of the WebTV™ system. If the user selects the Screen 25 hypertext anchor 71, the Screen Control screen is displayed. The WebTV™ Screen Control screen 74 is illustrated in FIG. 4B, and includes hypertext anchors 75 and 76. Hypertext anchor 75 is a link to the Picture Adjustment screen, and hypertext anchor 76 labeled 'Done' is a link back to the Setup page 70 of the WebTV™ system.

If the user selects the Picture Adjustment hypertext anchor 76, access to a series of picture adjustment screens is initiated. According to one embodiment of the present invention, picture adjustment screens are provided for several display characteristics of display monitor such as picture contrast, brightness, sharpness. In other embodiments, different picture adjustment screens may be provided for other display characteristics such as color, hue, and any other characteristic that determines the quality of the displayed image.

Contrast Control

Figure 5A:
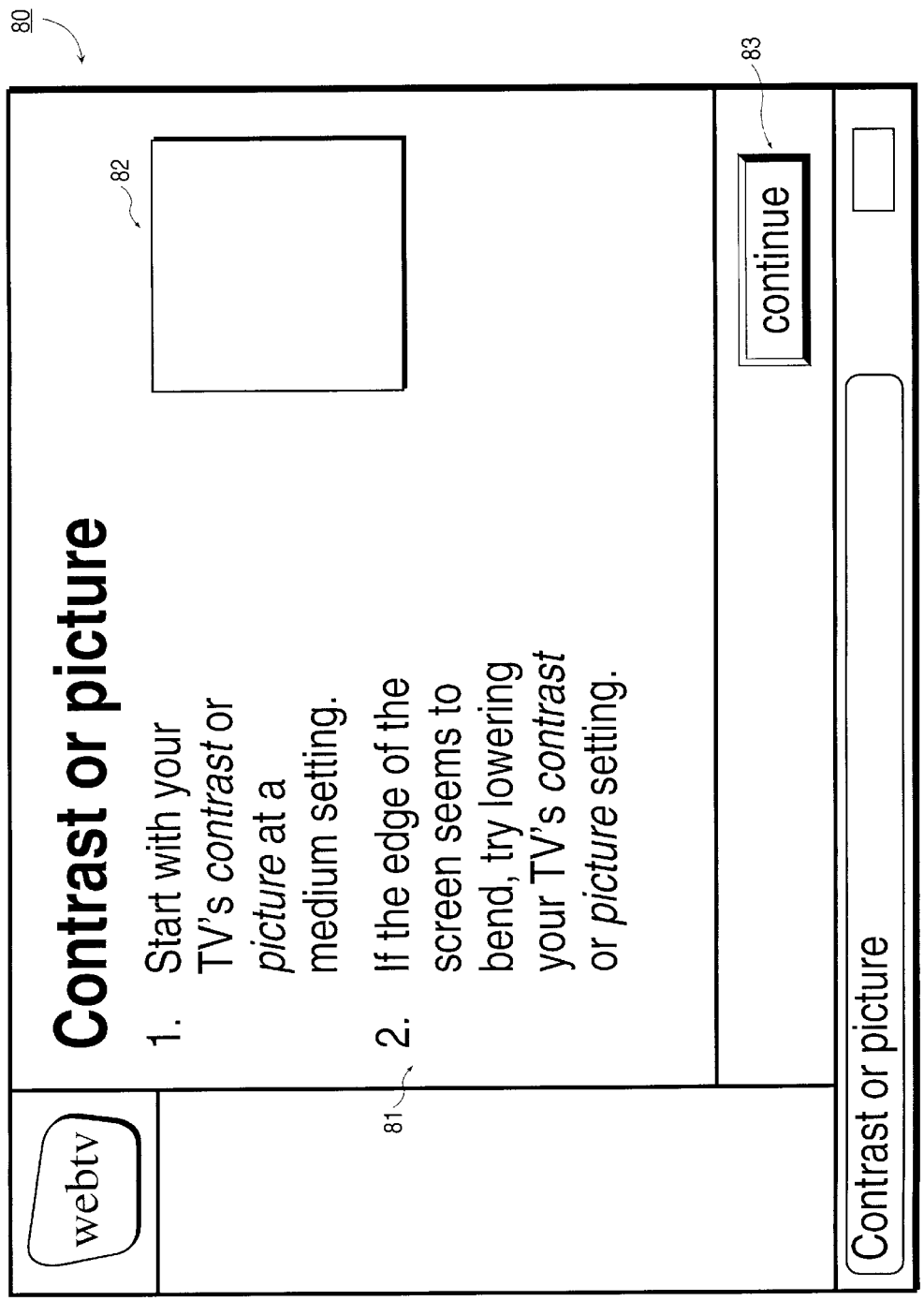
FIG. 5A illustrates the Contrast Control screen of the WebTV™ web browser program.

In one embodiment of the present invention, if the user selects the continue hypertext anchor 79 in Picture Adjustment screen 77, a Contrast Control Screen is displayed. FIG. 5A illustrates the Contrast Control Screen 80 which provides a display against which a contrast adjustment can be made for television 12. The Contrast Control Screen 80 includes an instruction field 81, a test pattern field 82, and a 'continue' hypertext anchor 83. The instruction field contains text instructing the user to invoke the contrast controls on his television set and manipulate them to optimize the display of the test pattern displayed in field 82. The test pattern display field 82 provides a region in which a test pattern may be displayed. Any pattern which provides feedback of contrast alteration as the user changes the display's contrast controls would be suitable for use as a test pattern. For example, one such test pattern could consist of a circle with one half displayed in a lighter shade than the other half. In one embodiment of the present invention, instruction field 81 contains instructions telling the user to alter the contrast control until the image on the screen starts to bend at the edges. On many display monitors and televisions, screen bending indicates an improperly set contrast level.

If television 12 requires the user to turn a contrast knob to adjust the contrast, the user is to turn or slide the knob accordingly. If the television 12 features electronic display control and on-screen display menus, the user is to invoke the contrast control accordingly. The on-screen display controls are controlled and manipulated using the television controls. These controls are not directly controllable by the WebTV™ system. Depending on the type of television used, the user typically invokes the on-screen menu either through front panel buttons 8 or a button on the television remote control unit 9.

Figure 5B:
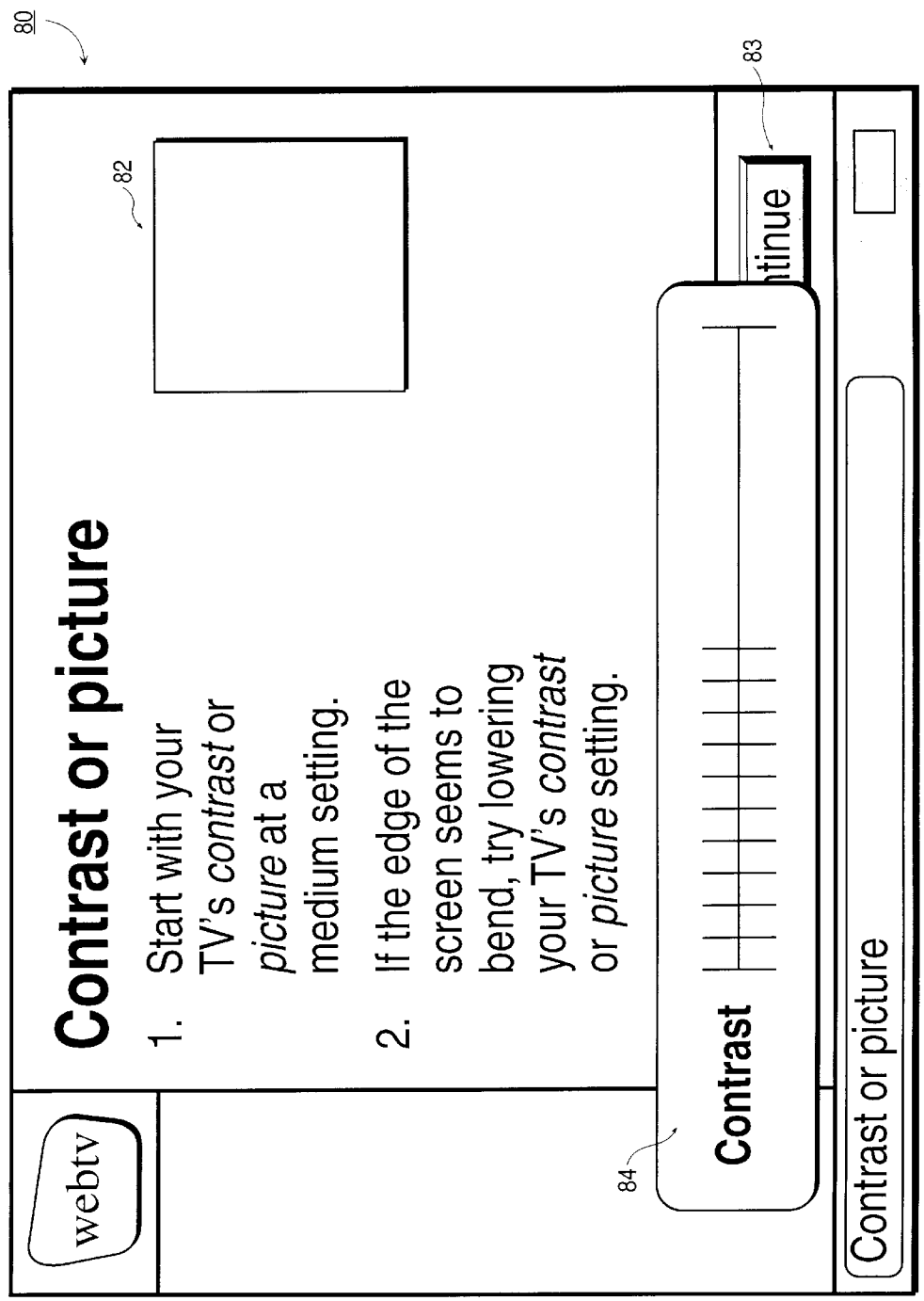
FIG. 5B illustrates the Contrast Control screen of the WebTV™ web browser program with a television on-screen control menu overlaid.

FIG. 5B illustrates the Contrast Control Screen 80 of the WebTV™ system overlaid with the contrast control menu 84 for the television display. Using the appropriate control device, the user slides the contrast cursor along the contrast scale. As the cursor is moved along the scale, the of the screen or test pattern in field 82 changes accordingly. The user selects the contrast setting in accordance with the optimum contrast of the test pattern. After the user sets the contrast of the display to the proper position, he selects the continue anchor 83 to invoke the next picture adjustment screen.

Brightness Control

Figure 6A:
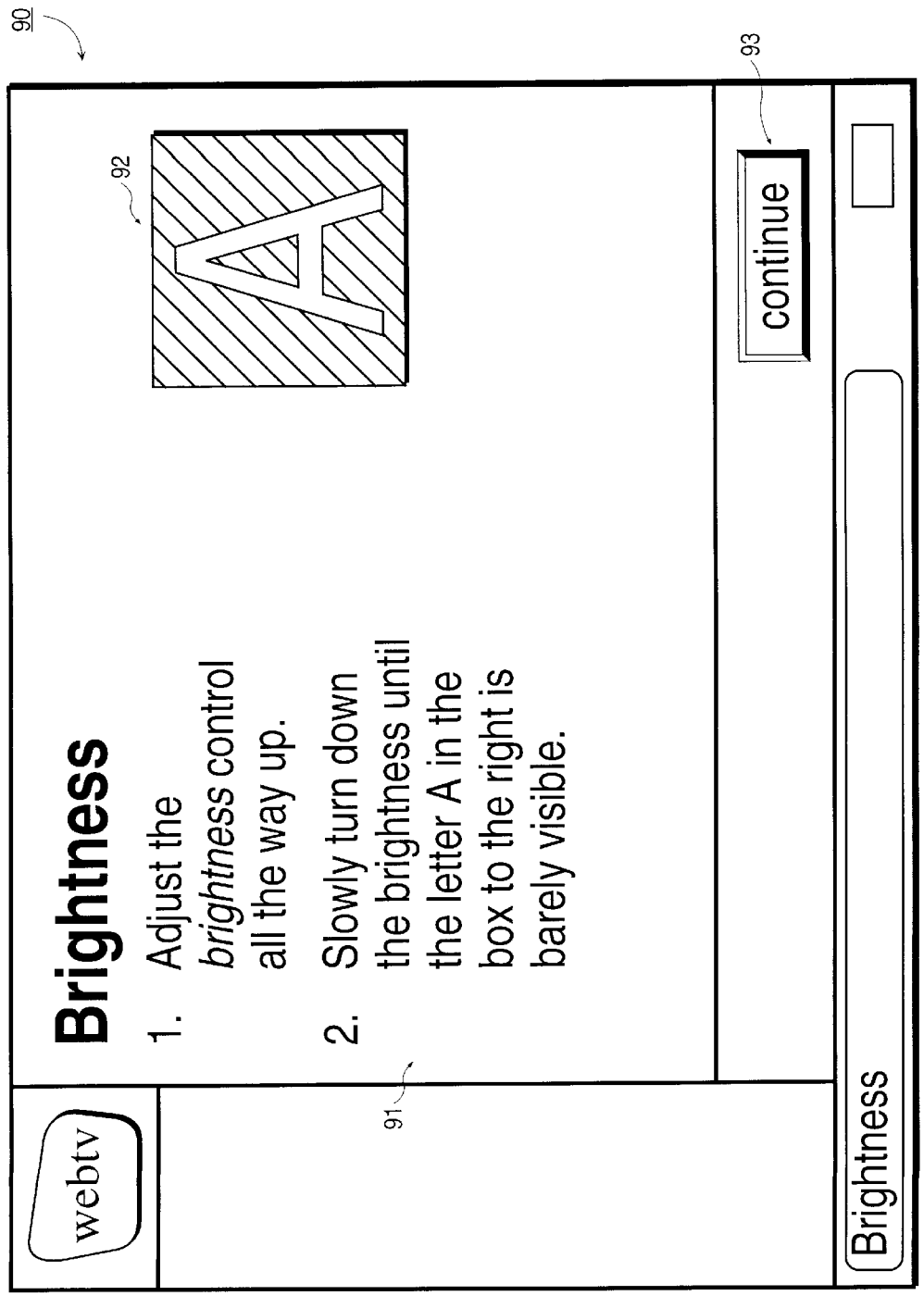
FIG. 6A illustrates the Brightness Control screen of the WebTV™ web browser program.

In one embodiment of the present invention, if the user selects the continue hypertext anchor 83 in Contrast Control Screen 80, a Brightness Control Screen is displayed. FIG. 6A illustrates the Brightness Control Screen 90 which provides a display against which a brightness adjustment can be made for television 12. The Brightness Control Screen 90 includes an instruction field 91, a test pattern field 92, and a 'continue' hypertext anchor 93. The instruction field contains text instructing the user to invoke the brightness controls on his television set and manipulate them to optimize the display of the test pattern displayed in field 92. The test pattern display field 92 contains a test pattern graphic. In one embodiment of the present invention the test pattern consists of a block letter representation of the letter 'A' displayed against a shaded box. The letter is illustrated in one shade and the box is illustrated in a second shade. Instruction field 91 contains instructions telling the user to alter the brightness control on television 12 until the letter 'A' is barely visible against the dark background. At this point the brightness of the displayed image is set properly.

If television 12 requires the user to turn a brightness knob to adjust the picture brightness, the user is to turn or slide the knob accordingly. If the television 12 features electronic display control and on-screen display menus, the user is to invoke the brightness control accordingly. The on-screen display controls are controlled and manipulated using the television controls. These controls are not directly controllable by the WebTV™ system. Depending on the type of television used, the user typically invokes the on-screen menu either through front panel buttons 8 or a button on the television remote control unit 9.

Figure 6B:
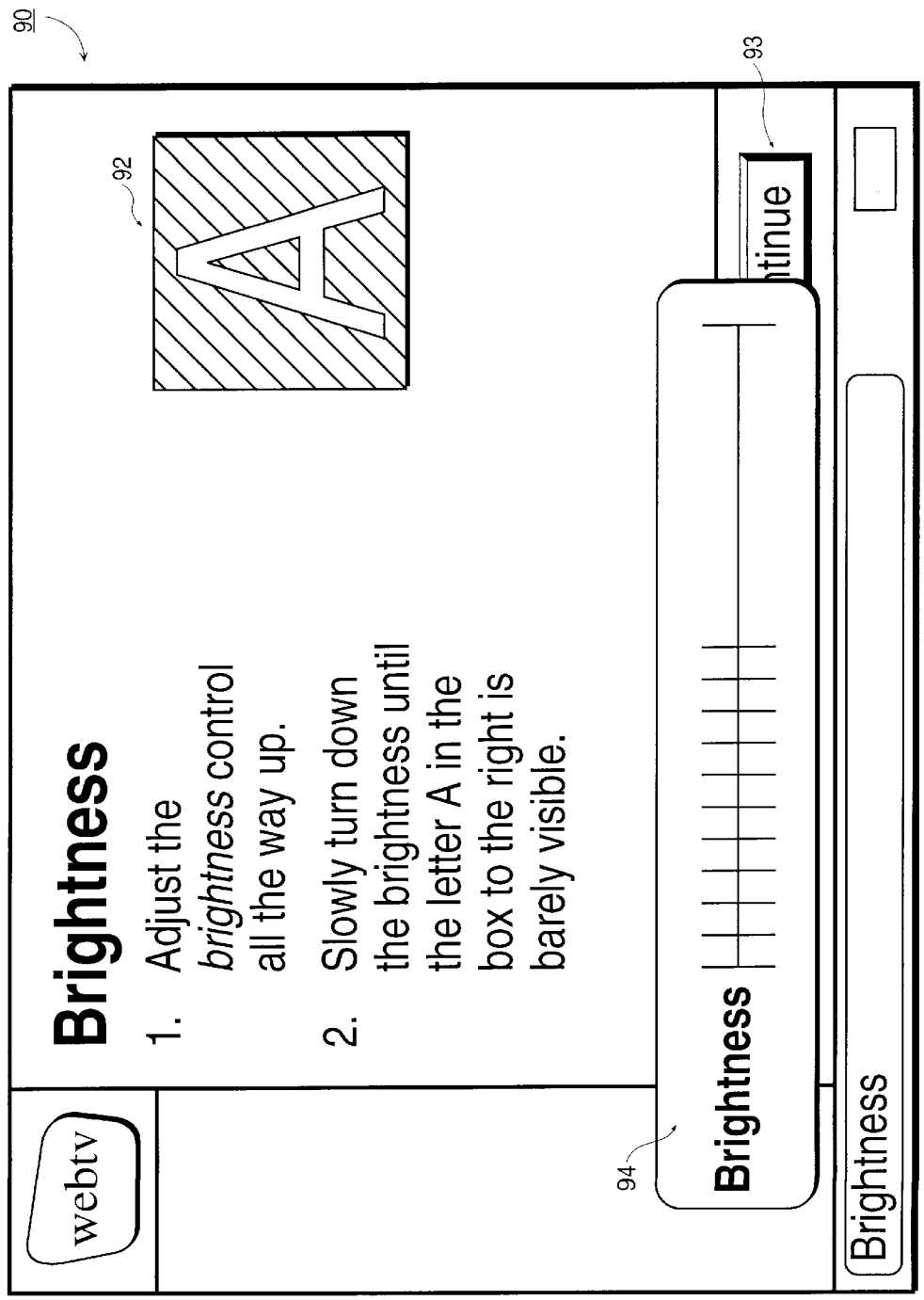
FIG. 6B illustrates the Brightness Control screen of the WebTV™ web browser program with a television on-screen control menu overlaid.

FIG. 6B illustrates the Brightness Control Screen 90 of the WebTV™ system overlaid with the brightness control menu 94 for the television display. Using the appropriate control device, the user slides the brightness cursor along the brightness scale. As the cursor is moved along the scale, the appearance of test pattern 92 changes accordingly. The user selects the brightness setting in accordance with the optimum brightness of the test pattern. After the user sets the brightness of the display to the proper position, he selects the continue anchor 93 to invoke the next picture adjustment screen.

Sharpness Control

Figure 7A:
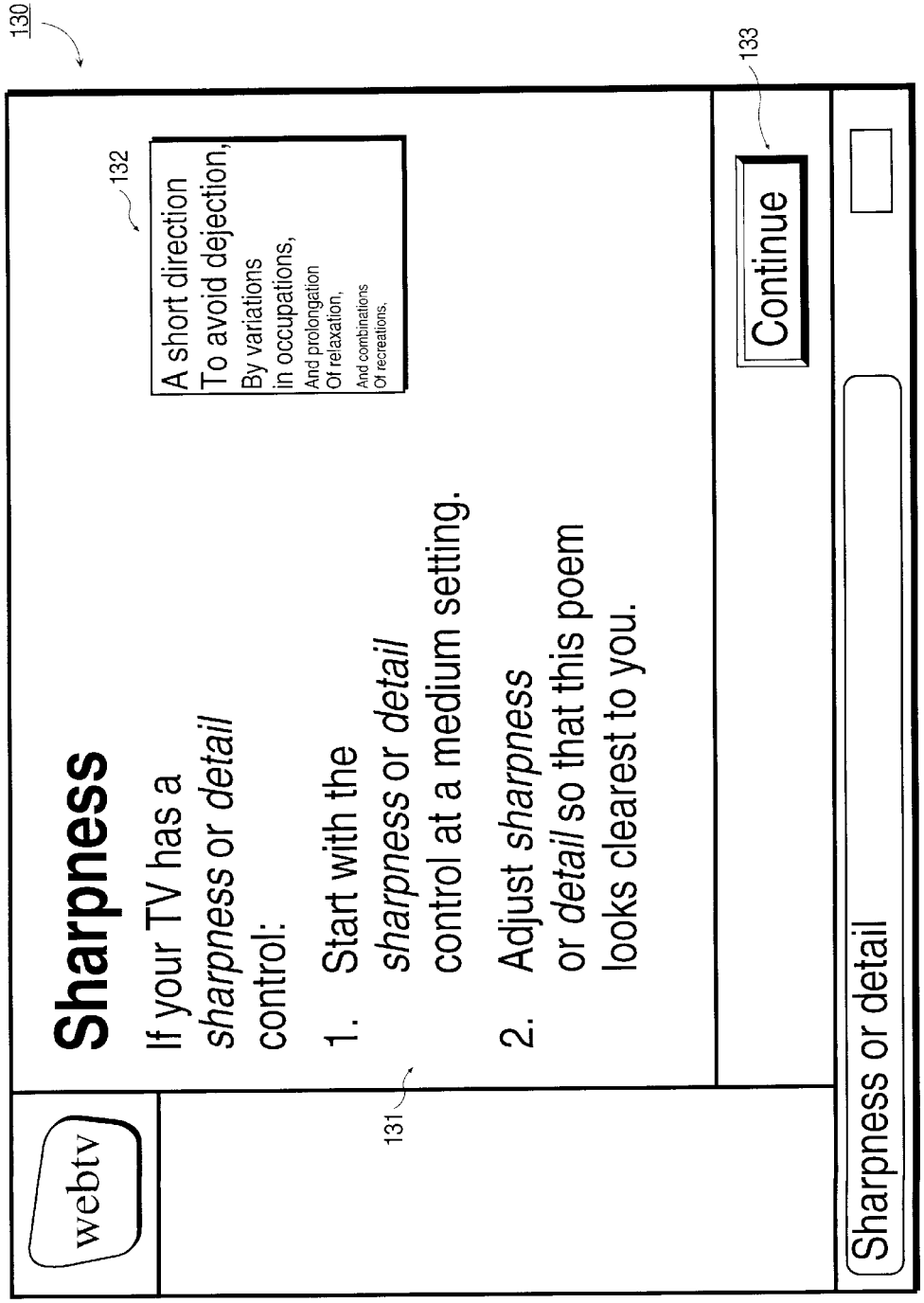
FIG. 7A illustrates the Sharpness Control screen of the WebTV™ web browser program.

In one embodiment of the present invention, if the user selects the continue hypertext anchor 93 in Brightness Control Screen 90, a Sharpness Control Screen is displayed. FIG. 7A illustrates the Sharpness Control Screen 130 which provides a display against which a sharpness adjustment can be made for television 12. The Sharpness Control Screen 130 includes an instruction field 131, a test pattern field 132, and a 'continue' hypertext anchor 133. The instruction field contains text instructing the user to invoke the sharpness controls on his television set and manipulate them to optimize the display of the test pattern displayed in field 132. The test pattern display field 132 contains a test pattern graphic. In one embodiment of the present invention the test pattern consists of a sentence in black text displayed against a white background. Instruction field 131 contains instructions telling the user to alter the sharpness control on television 12 until the outlines of the black characters most readable against the white background. At this point the sharpness of the displayed image is set properly.

If television 12 requires the user to turn a sharpness knob to adjust the picture sharpness, the user is to turn or slide the knob accordingly. If the television 12 features electronic display control and on-screen display menus, the user is to invoke the sharpness control accordingly. The on-screen display controls are controlled and manipulated using the television controls. These controls are not directly controllable by the WebTV™ system. Depending on the type of television used, the user typically invokes the on-screen menu either through front panel buttons 8 or a button on the television remote control unit 9. Note that on some televisions, the sharpness function may be called 'picture' instead.

Figure 7B:
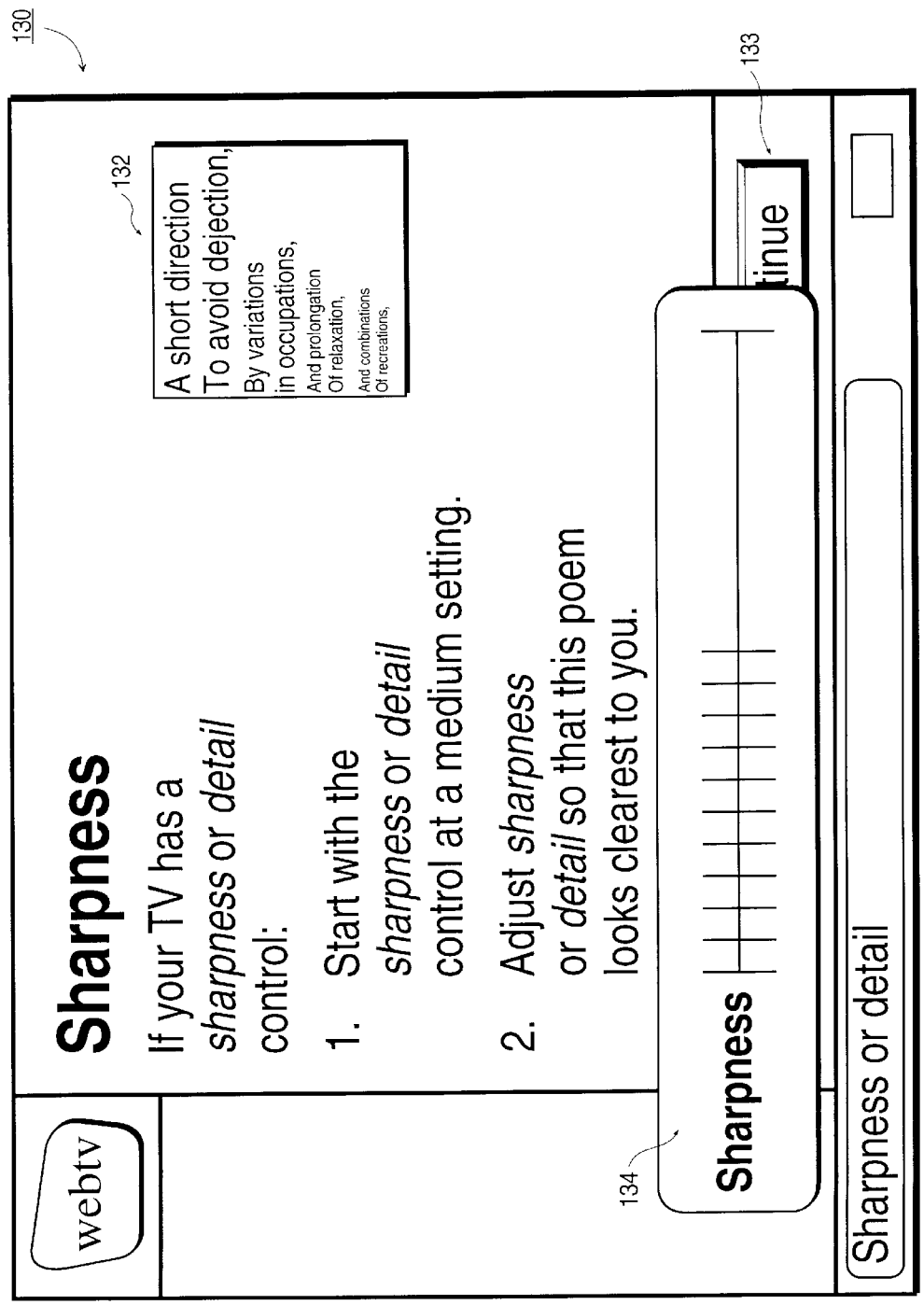
FIG. 7B illustrates the Sharpness Control screen of the WebTV™ web browser program with an on-screen control menu overlaid.

FIG. 7B illustrates the Sharpness Control Screen 130 of the WebTV™ system overlaid with the sharpness control menu 134 for the television display. Using the appropriate control device, the user slides the sharpness cursor along the sharpness scale. As the cursor is moved along the scale, the appearance of test pattern 132 changes accordingly. The user selects the sharpness setting in accordance with the optimum sharpness of the test pattern. After the user sets the sharpness of the display to the proper position, he selects the continue anchor 133 to invoke the next picture adjustment screen.

Color Control

Figure 8A:
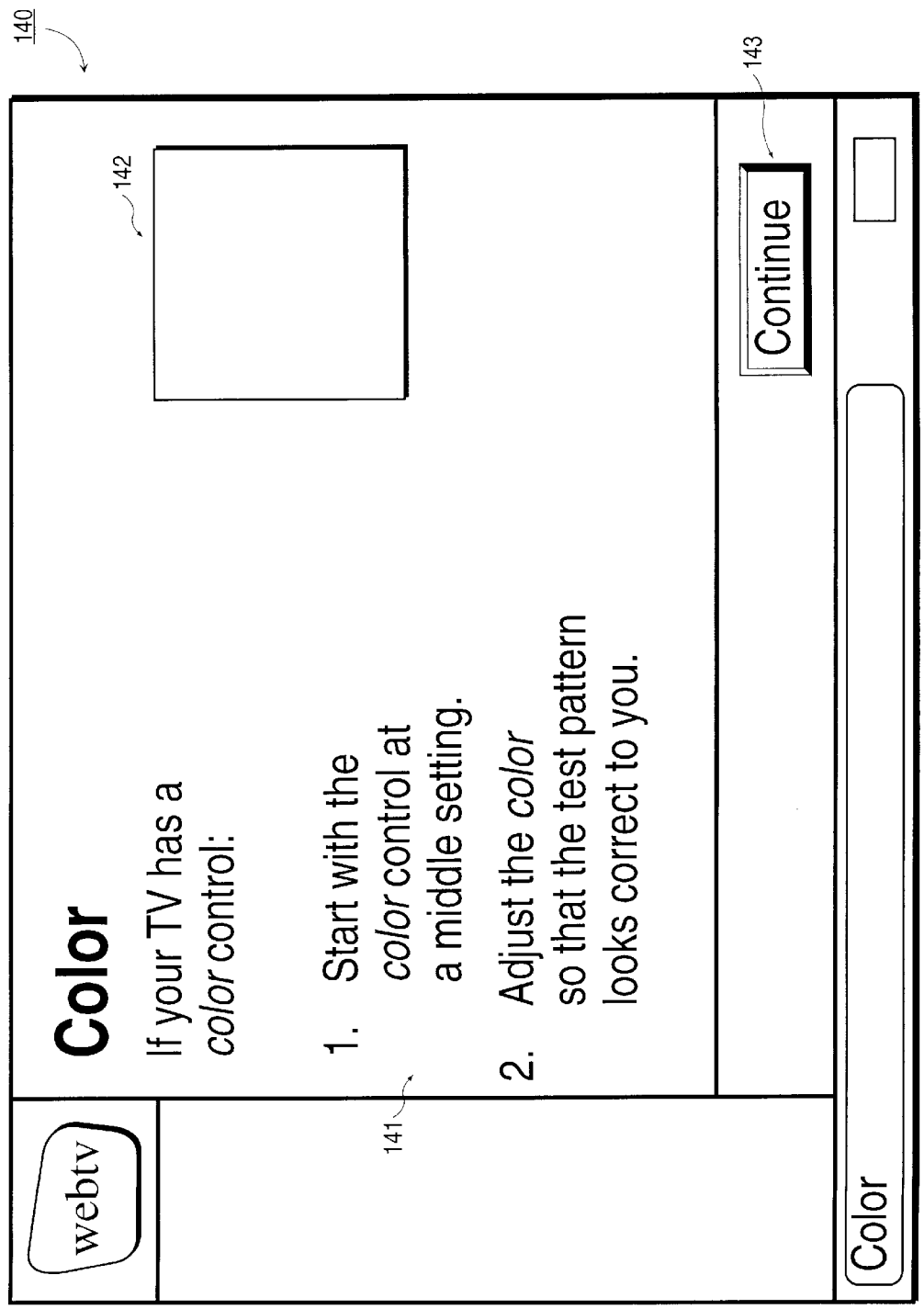
FIG. 8A illustrates a Color Control screen of the WebTV™ web browser program.

Besides contrast, brightness, and sharpness, picture adjustment screens may also be provided for other display characteristics such as color and hue. FIG. 8A illustrates a Color Control Screen 140 which may be provided to provide a display against which a color adjustment can be made for television 12. Such a Color Control Screen may be made available by the user selecting the continue hypertext anchor 133 in Sharpness Control Screen 130. The Color Control Screen 140 includes an instruction field 141, a test pattern field 142, and a 'continue' hypertext anchor 143. The instruction field contains text instructing the user to invoke the color controls on his television set and manipulate them to optimize the display of the test pattern displayed in field 142. The test pattern display field 142 provides a region in which a test pattern could be displayed. Any pattern which provides feedback of color alteration as the user changes the display's color controls would be suitable for use as a test pattern. Instruction field 141 could contain instructions telling the user to alter the color control on television 12 until the test pattern in field 142 appears to be of an acceptable color intensity.

If television 12 requires the user to turn a color knob to adjust the picture color, the user is to turn or slide the knob accordingly. If the television 12 features electronic display control and on-screen display menus, the user is to invoke the color control accordingly. The on-screen display controls are controlled and manipulated using the television controls. These controls are not directly controllable by the WebTV™ system. Depending on the type of television used, the user typically invokes the on-screen menu either through front panel buttons 8 or a button on the television remote control unit 9.

Figure 8B:
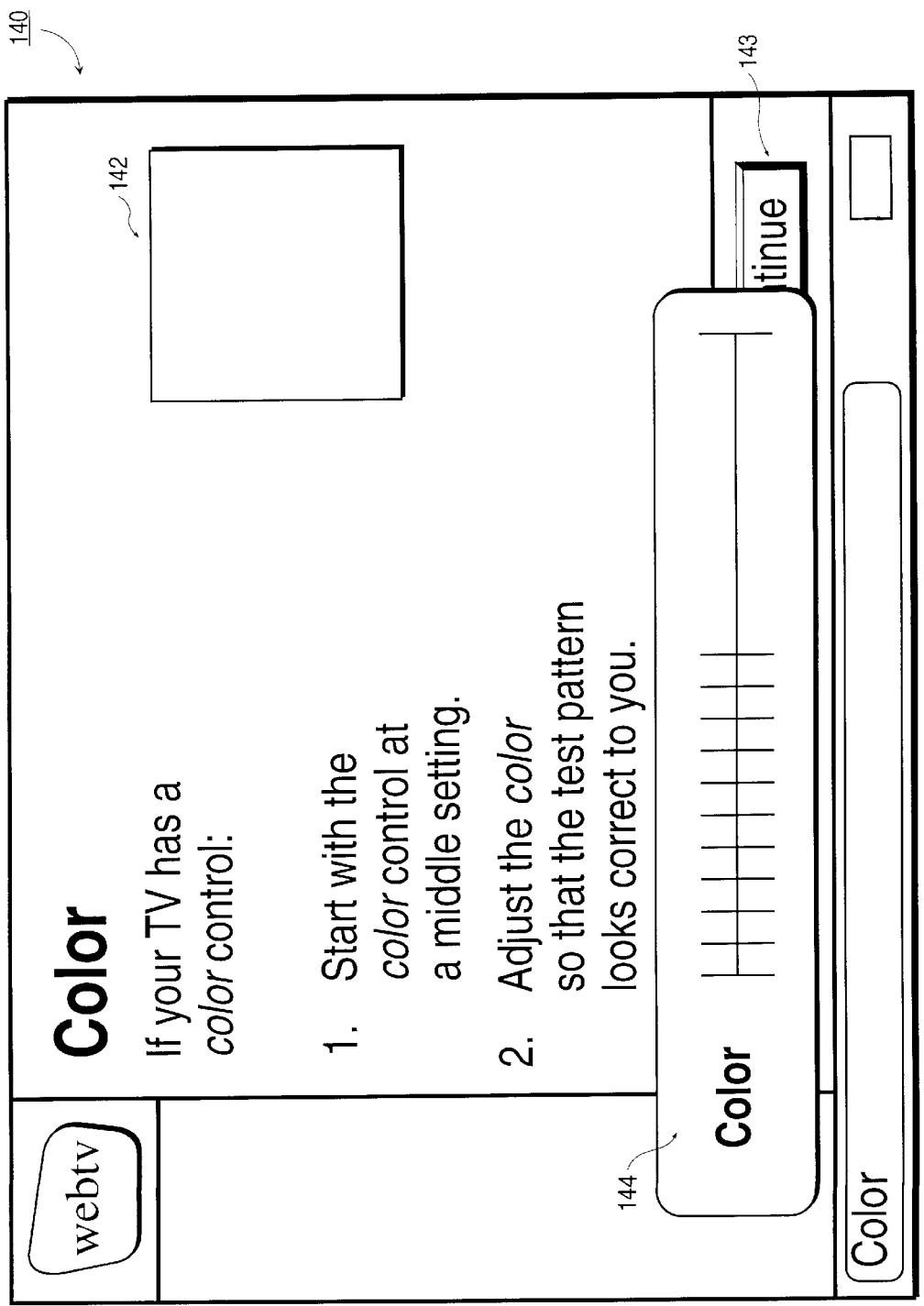
FIG. 8B illustrates a Color Control screen of the WebTV™ web browser program with an on-screen control menu overlaid.

FIG. 8B illustrates the Color Control Screen 140 of the WebTV™ system overlaid with the color control menu 144 for the television display. Using the appropriate control device, the user slides the color cursor along the color scale. As the cursor is moved along the scale, the appearance of the test pattern changes accordingly. The user selects the color setting in accordance with the optimum color of the test pattern. After the user sets the color of the display to the proper position, he selects the continue hypertext anchor 143 to invoke the next display adjustment screen.

Hue Control

Figure 9A:
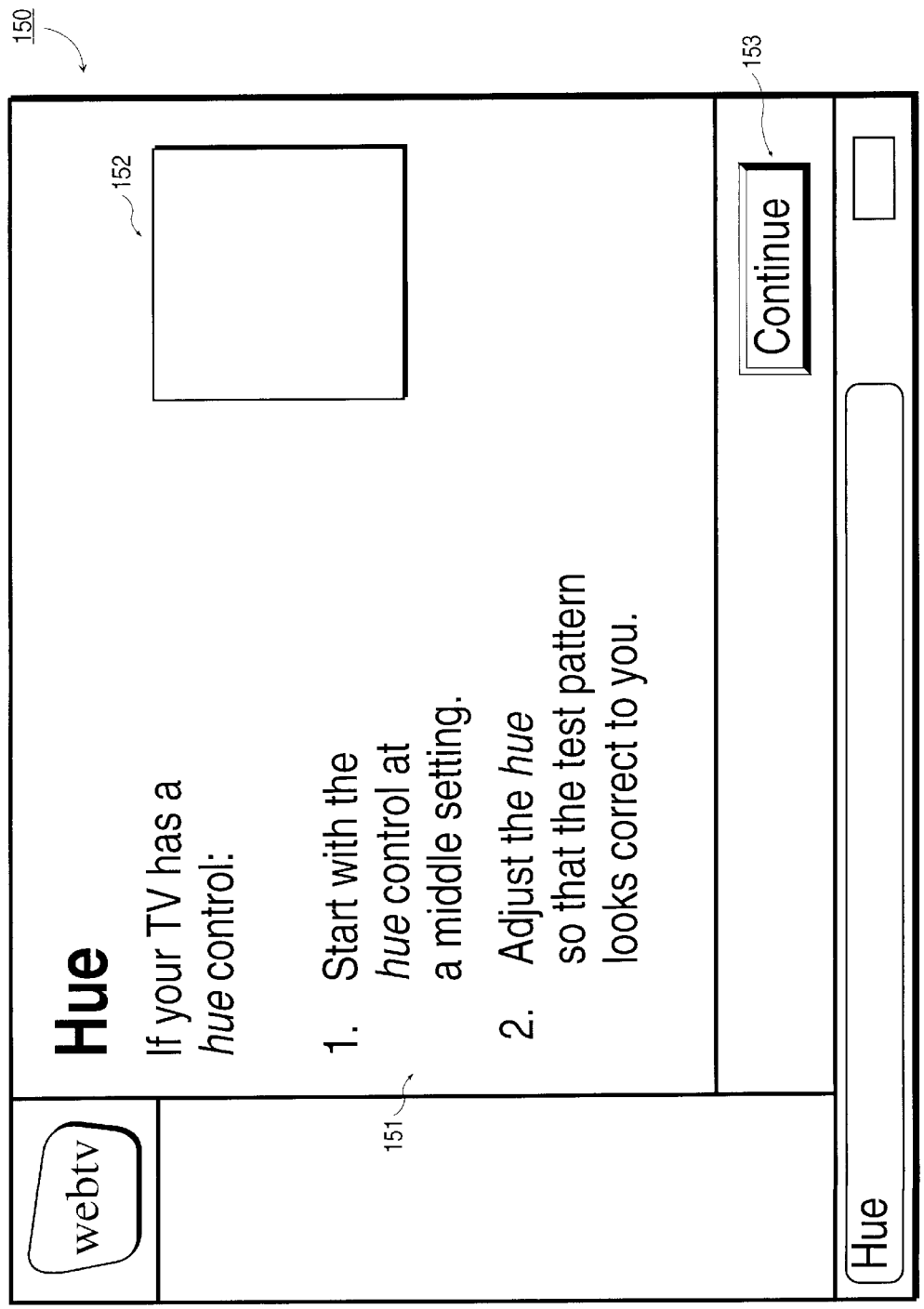
FIG. 9A illustrates a Hue Control screen of the WebTV™ web browser program.

Hue is another display characteristic that may be tuned by the method of the present invention. FIG. 9A illustrates a Hue Control Screen 140 which may be provided to provide a display against which a hue adjustment can be made for television 12. Such a Hue Control Screen may be made available by the user selecting the continue hypertext anchor 143 in Color Control Screen 140. The Hue Control Screen 150 includes an instruction field 151, a test pattern field 152, and a 'continue' hypertext anchor 153. The instruction field contains text instructing the user to invoke the hue controls on his television set and manipulate them to optimize the display of the test pattern displayed in field 152. The test pattern display field 152 provides a region in which a test pattern could be displayed. Any pattern which provides feedback of color alteration as the user changes the display's hue controls would be suitable for use as a test pattern. Instruction field 151 could contain instructions telling the user to alter the hue control on television 12 until the color weight of the test pattern is of a suitable appearance.

If television 12 requires the user to turn a hue knob to adjust the picture hue, the user is to turn or slide the knob accordingly. If the television 12 features electronic display control and on-screen display menus, the user is to invoke the hue control accordingly. The on-screen display controls are controlled and manipulated using the television controls. These controls are not directly controllable by the WebTV™ M system. Depending on the type of television used, the user typically invokes the on-screen menu either through front panel buttons 8 or a button on the television remote control unit 9.

Figure 9B:
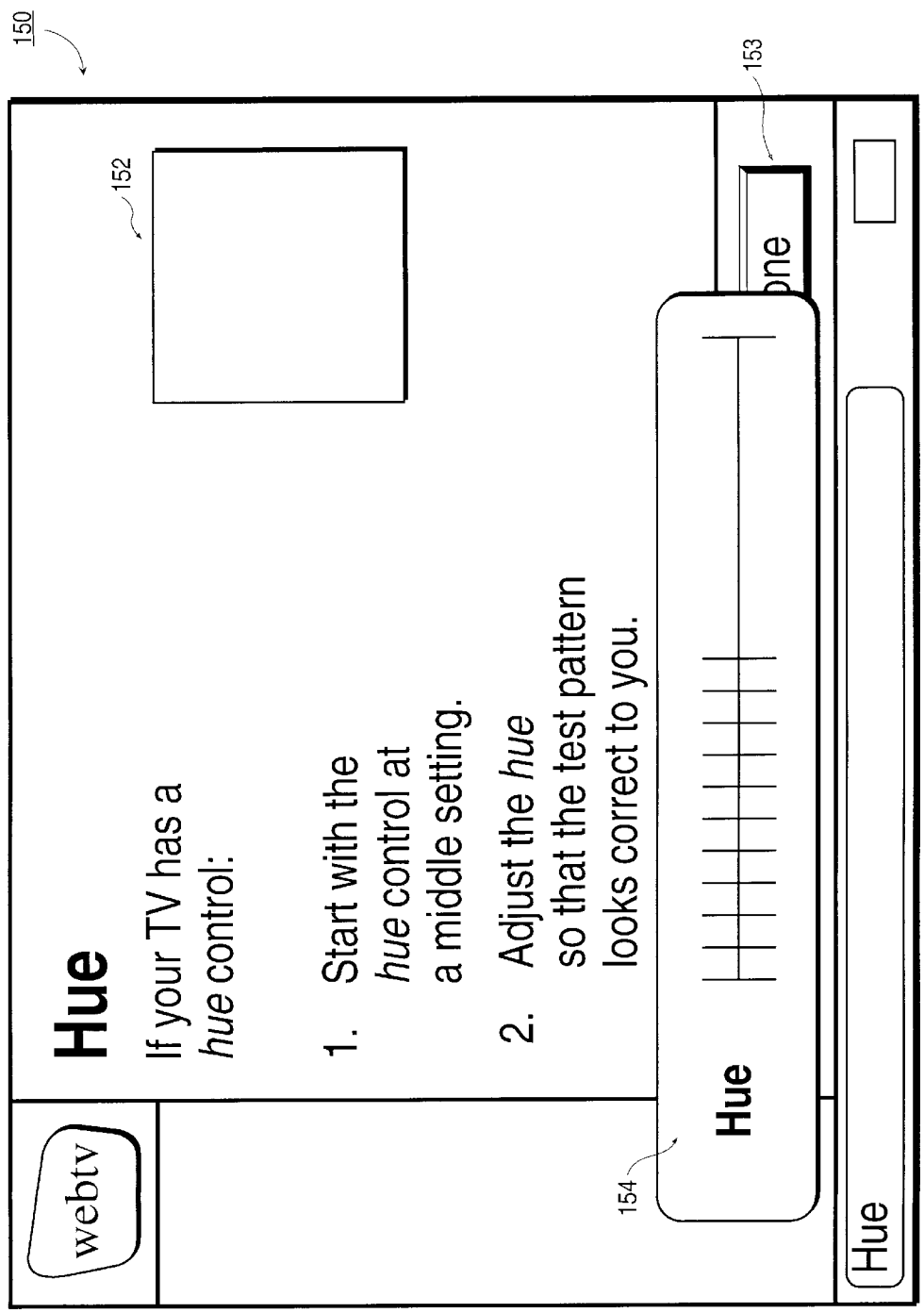
FIG. 9B illustrates a Hue Control screen of the WebTV™ web browser program with an on-screen control menu overlaid.

FIG. 9B illustrates the Hue Control Screen 150 of the WebTV™ system overlaid with the hue control menu 154 for the television display. Using the appropriate control device, the user slides the hue cursor along the hue scale. As the cursor is moved along the scale, the appearance of test pattern 152 changes accordingly. The user selects the hue setting in accordance with the optimum hue of the test pattern. After the user sets the hue of the display to the proper position, he selects the continue anchor 153 to invoke the next picture adjustment screen. If no further picture adjustment screens are available, the WebTV™ Setup screen 70 is displayed.

Display Adjustment Operation

Figure 10A:
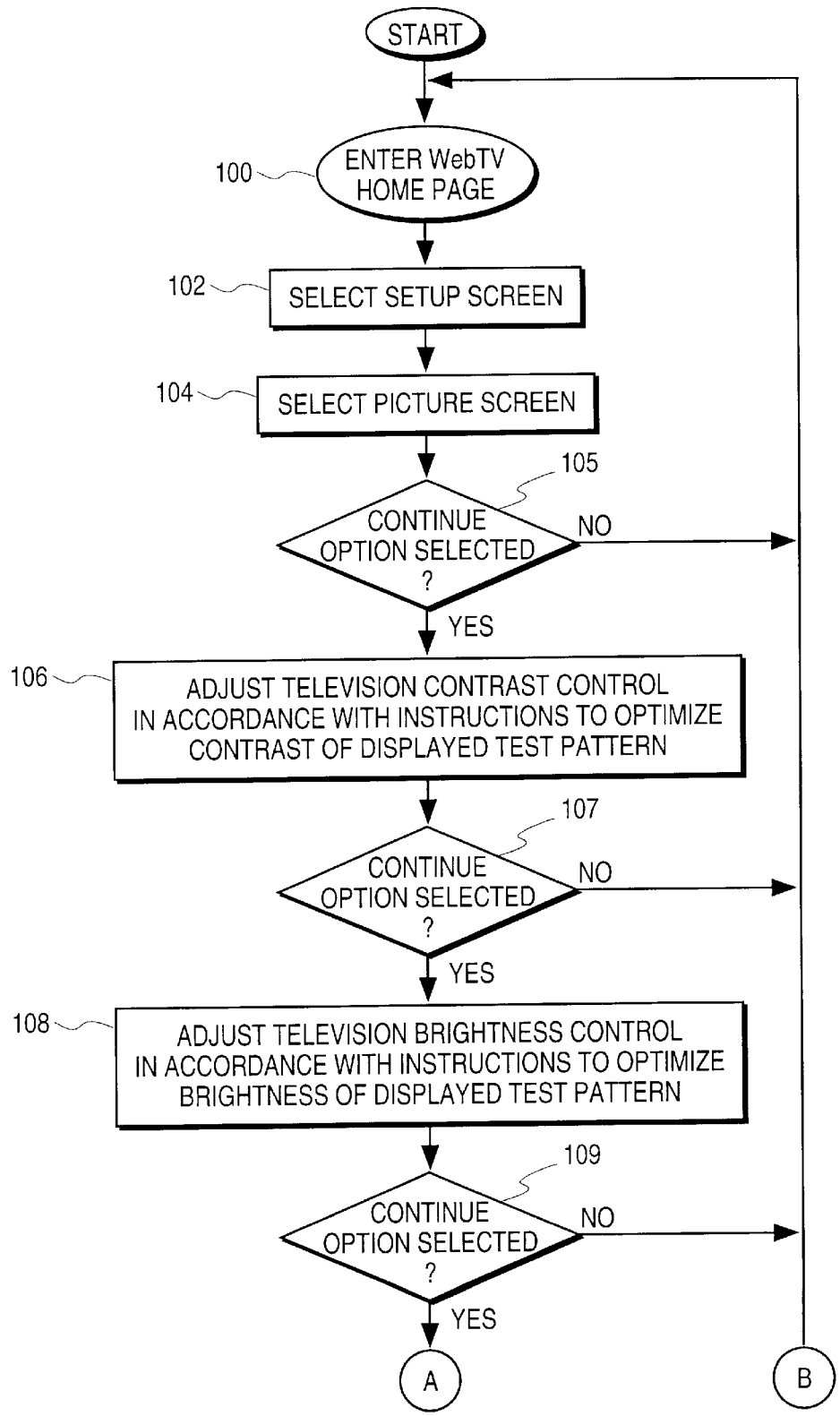
FIGS. 10A and 10B are flow charts illustrating a procedure for adjusting the display characteristics of a display monitor according to an embodiment of the present invention.
Figure 10B:
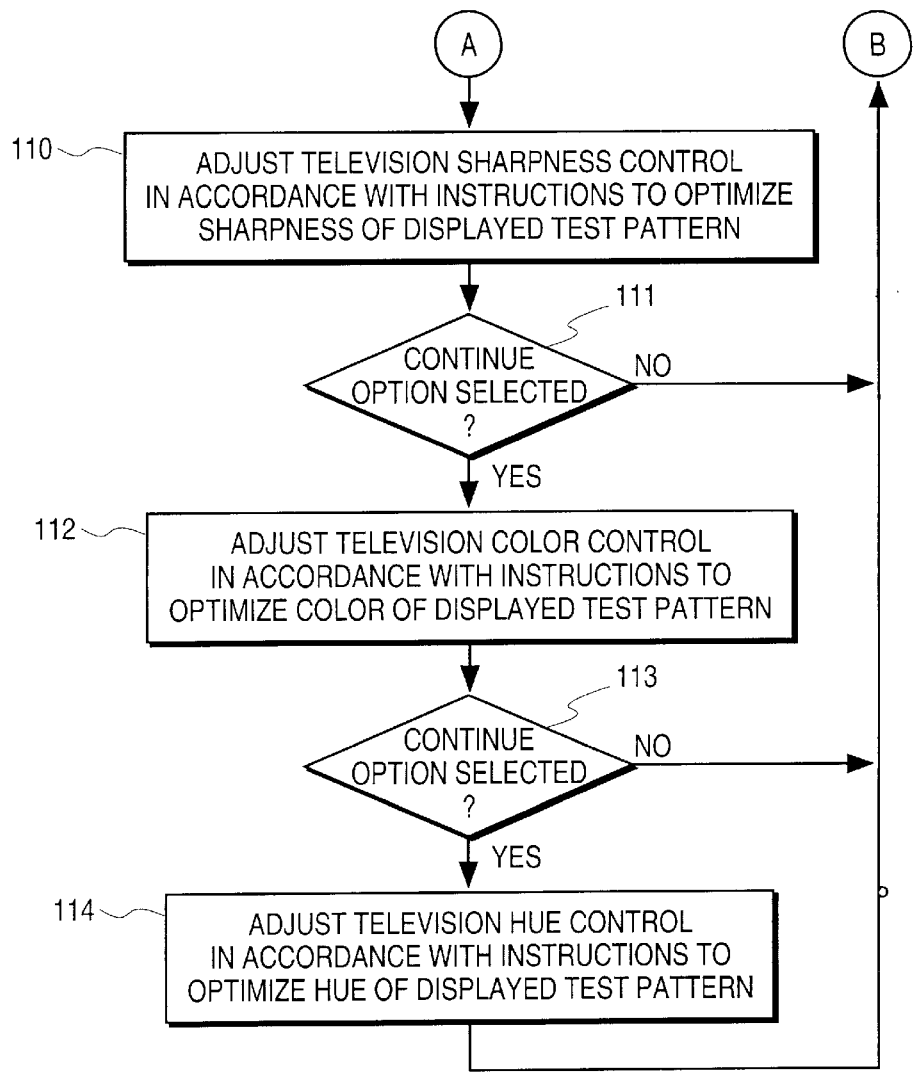

FIG. 10 illustrates the process of tuning the display characteristics of a television display to optimize the display of web pages according to one embodiment of the present invention. The user begins by entering the WebTV™ home page at step 100. As shown in FIG. 3, the WebTV™ Home Page 60 contains two hypertext anchors, Setup and Instructions. If the user selects the Setup anchor 63, step 102, the WebTV™ Setup Screen 70, illustrated in FIG. 4A, is displayed. Selecting the Screen hypertext anchor 71 within the Setup screen 70 causes the Screen Control screen 74, illustrated in FIG. 4B, to be displayed.

Figure 4C:
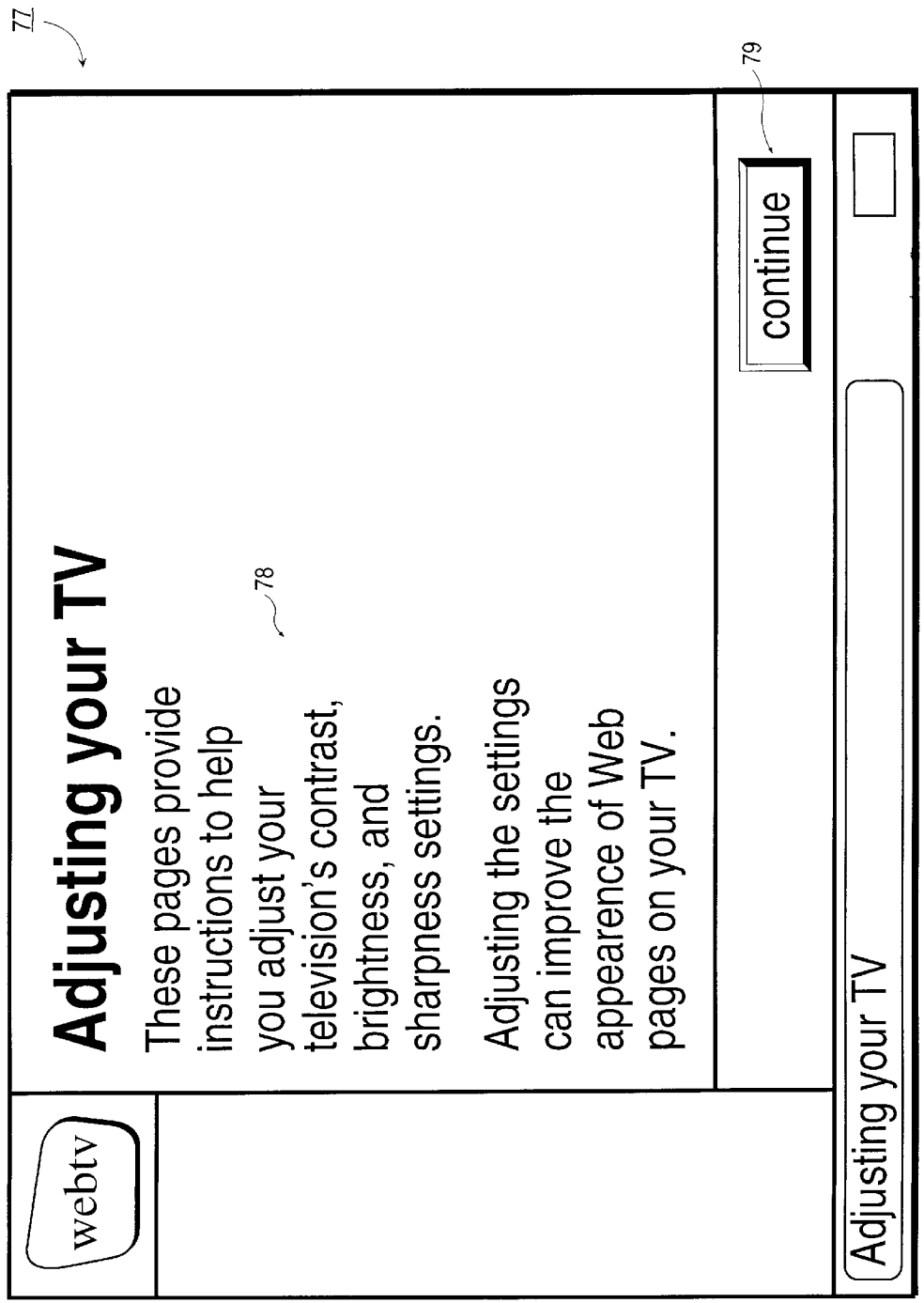
FIG. 4C illustrates the Picture Adjustment screen of the WebTV™ web browser program.

As shown in FIG. 4B, the WebTV™ Screen Control screen 74 contains two hypertext anchors, Center and Picture. If the user selects the Picture anchor 76, step 104, the WebTV™ Picture Adjustment screen, illustrated in FIG. 4C, is displayed. The WebTV™ Picture Adjustment screen contains instructions telling the user how the WebTV™ picture adjustment screens may be used to tune the picture quality of the television. The Picture Adjustment screen also contains a hypertext anchor 'continue'. If the user selects the continue anchor, step 105, the Contrast control screen 80 is displayed.

At step 106, the user adjusts the television contrast control knob or the on-screen contrast control menu cursor according to the operation of the television. The user adjusts the contrast setting so that the display is correct or the contrast of a test pattern displayed in the Contrast Control Screen is at the desired level. The Contrast Control Screen 80, illustrated in FIG. 5A, contains a hypertext anchor 'continue'. If the user selects the continue anchor, step 107, the Brightness Control Screen 90 is displayed. Alternatively, the user may re-enter the WebTV™ home page by pressing the appropriate control on remote control 11.

At step 108, the user adjusts the television brightness control knob or the on-screen brightness control menu cursor according to the operation of the television. The user adjusts the brightness setting so that the brightness of the test pattern displayed in the Brightness Control Screen is at the desired level. The Brightness Control Screen 90, illustrated in FIG. 6A, contains a hypertext anchor 'continue'. If the user selects the continue anchor, step 109, the Sharpness Control Screen 130 is displayed. Alternatively, the user may re-enter the WebTV™ home page by pressing the appropriate control on remote control 11.

At step 110, the user adjusts the television sharpness control knob or the on-screen sharpness control menu cursor according to the operation of the television. The user adjusts the sharpness setting so that the sharpness of the test pattern displayed in the Sharpness Control Screen is at the desired level.

The Sharpness Control Screen 130, illustrated in FIG. 7A, contains a hypertext anchor 'continue'. If the user selects the continue anchor, step 111, the Color Control Screen 140 is displayed. Alternatively, the user may re-enter the WebTV™ home page by pressing the appropriate control on remote control 11.

At step 112, the user adjusts the television color control knob or the on-screen color control menu cursor according to the operation of the television. The user adjusts the color setting so that the display or the color of the a test pattern displayed in the Color Control Screen is at the desired level. The Color Control Screen 140, illustrated in FIG. 8A, contains a hypertext anchor 'continue'. If the user selects the continue anchor, step 113, the Hue Control Screen 150 is displayed. Alternatively, the user may re-enter the WebTV™ home page by pressing the appropriate control on remote control 11.

At step 114, the user adjusts the television hue control knob or the on-screen hue control menu cursor according to the operation of the television. The user adjusts the hue setting so that the display or the hue of a test pattern displayed in the Hue Control Screen is at the desired level.

The Hue Control Screen 150, illustrated in FIG. 9A, contains an hypertext anchor 'done'. If the user selects the done anchor, the WebTV™ home page is displayed, and the user may continue normal web browsing operation.

It should be noted that other display adjustment screens for facilitating control over other display characteristics besides those listed above may be implemented according to the methods provided in the above disclosure. Similarly, not all picture adjustment screens disclosed above need be created and accessed in order to implement the present invention.

In another embodiment of the present invention, the picture adjustment screens do not have embedded test pattern graphics which are displayed on the screen as an embedded graphic. Instead, the display adjustment screen itself is used as a reference pattern to calibrate the picture quality of the display device. Alternatively, the picture adjustment screen could contain a hypertext anchor which links the picture adjustment screen to another screen which contains a test pattern or suitable graphic.

Control Screen Authoring

In one embodiment of the present invention, the WebTV™ Home Page and Setup Page are created using standard HTML command structures well known to those skilled in the art. Similarly, each of the picture adjustment screens: brightness, contrast, sharpness, color, and hue are also produced by constructing HTML objects and program links. Various different page formats and sequences may be utilized to achieve the present invention.

According to another embodiment, picture adjustment screens could be produced using bit-mapped images or standard graphic format images, and displayed on a display device through a network interface, or over a broadcast signal. In such embodiments the picture adjustment screens need not be Web pages accessed from the World-Wide Web using a Web browser, but instead could be images of the type normally created, transmitted and displayed within the system in which the display device is typically used, such as a Local Area Network for a computer display, or a broadcast system for a television. In yet another embodiment, the picture adjustment screens could programmed into the display device as a built-in feature and accessed through a dedicated control button or on-screen menu.

The test patterns contained in the picture adjustment screens are designed to accentuate the display characteristic to be adjusted. In one embodiment of the present invention, a characteristic of the screen itself, the edge bend is used to measure the contrast level. Alternatively, however, a contrast test pattern made up of a black pattern set adjacent to a white pattern which provides an effective measurement of the contrast between black and white for a particular display monitor, could be provided. Similarly, the test pattern for the Brightness Control screen is made up of two graphic objects of different brightness levels placed one on top of the other. This produces a pattern which allows the direct comparison of the relative brightness level of two objects in relation to one another. The sharpness test pattern is made up of words in black text of different point sizes displayed against a white background. This allows a clear visualization of blurriness around the edges of graphic images which is an indication of image sharpness. A test pattern for the color control screen could be a pattern such as the industry standard color bar chart which displays the color range of red, green, blue, and yellow. A typical color chart also contains fields for white and three shades of black. In an alternative embodiment, one of the black color patterns within the color chart could be programmed as a negative black. Negative black has a color value that is lower than the value coded for standard black. A test pattern for the hue control screen could be a pattern simply made up of a red, green, blue pattern. This would provide a means of measuring the color shift displayed by a display monitor as the hue control is adjusted.

Each of the test patterns are graphics objects embedded within their respective Picture Adjustment screen through standard HTML object or function calls. In one embodiment, the test patterns are scanned or downloaded into a computer system and compressed in Graphic Interchange File (GIF) format. GIF is a dictionary based compression scheme used to encode bit-mapped graphical images. The incorporation of GIF images into HTML web pages is accomplished using techniques known to those skilled in the art In yet another embodiment, the test patterns may be drawing images created by a CAD or drawing program and stored in bit-map (BMP) form and incorporated into HTML web pages through standard HTML links.

It should be noted that the test images may be generated and displayed using any one of a number of standard compression techniques, such as the JPEG (Joint Photographic Expert Group) format.

It will be appreciated that the test patterns, need not be those used by industry professionals, but instead may be any pattern which features the display characteristic to be adjusted. For example, an array of colors for the color adjustment, and black on white for the contrast and sharpness adjustments.

Thus, a method and apparatus have been described for allowing a user to tune the picture quality of web pages displayed on a display device using a web browser program. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a networked computer system which includes a plurality of server systems each of which is connected to a network infrastructure which provides access to a plurality of sites, each site including one or more pages containing text or graphics, and the networked computer system including at least one client system which is connected either directly or logically to one or more of said server systems, and each client system comprising a conventional television monitor on which to display said one or more pages of an accessed site, and an electronic unit for controlling said television monitor in order to provide a user of the client system with a graphical user interface by which the user can browse said sites or otherwise access said network infrastructure, a method for interactively prompting a user as to the proper adjustment of the television monitor in order to optimize display of a page accessed at one of said sites, the method comprising the steps of:

the user using the television monitor to adjust the electronic unit to access a server system which contains a graphical user interface comprising interactive user instructions for adjustment of a picture on the television monitor;

downloading the interactive user instructions from the server system for display on the television monitor;

utilizing the electronic unit to activate one or more of the displayed interactive user instructions, which then instruct the user as to how to adjust the picture on the television monitor as to one or more selected characteristics of the picture; and adjusting the one or more selected characteristics of the picture on the television monitor in accordance with the one or more activated interactive user instructions.

2. A method according to claim 1, further comprising, prior to the stop of adjusting the one or more selected characteristics of the picture, the step of displaying a test pattern on the television monitor, said test pattern containing an attribute corresponding to at least one of the one or more selected characteristics of the picture.

3. A method according to claim 2, wherein the one or more activated interactive user instructions indicate that the user is to adjust the contrast of the television monitor until the test pattern exhibits a desired contrast attribute, the step of adjusting the one or more selected characteristics of the picture comprising the step of responding to user input generated as the user adjusts the contrast of the television monitor.

4. A method according to claim 2, wherein the one or more activated interactive user instructions indicate that the user is to adjust the brightness of the television monitor until the test pattern exhibits a desired brightness attribute, the step of adjusting the one or more selected characteristics of the picture comprising the step of responding to user input generated as the user adjusts the brightness of the television monitor.

5. A method according to claim 2, wherein the one or more activated interactive user instructions indicate that the user is to adjust the sharpness of the television monitor until the test pattern exhibits a desired sharpness attribute, the step of adjusting the one or more selected characteristics of the picture comprising the step of responding to user input generated as the user adjusts the sharpness of the television monitor.

6. A method according to claim 2, wherein the one or more activated interactive user instructions indicate that the user is to adjust the color of the television monitor until the test pattern exhibits a desired color attribute, the step of adjusting the one or more selected characteristics of the picture comprising the step of responding to user input generated as the user adjusts the color of the television monitor.

7. A method according to claim 2, wherein the one or more activated interactive user instructions indicate that the user is to adjust the hue of the television monitor until the test pattern exhibits a desired hue attribute, the stop of adjusting the one or more selected characteristics of the picture comprising the step of responding to user input generated as the user adjusts the hue of the television monitor.

8. A method according to claim 2, wherein said one or more selected characteristics of the picture comprise a display characteristic selected from the group consisting of contrast, brightness, sharpness, color and hue.

9. In a networked computer system which includes a plurality of server systems each of which is connected to a network infrastructure which provides access to a plurality of sites, each site including one or more pages containing text or graphics, and the networked computer system including at least one client system which is connected either directly or logically to one or more of said server systems, and each client system comprising a conventional television monitor on which to display said one or more pages of an accessed site, and an electronic unit for controlling said television monitor in order to provide a user of the client system with a graphical user interface by which the user can browse said sites or otherwise access said network infrastructure, a computer program product for use by said electronic unit to implement a method for interactively prompting a user as to the proper adjustment of the television monitor in order to optimize display of a page accessed at one of said sites, the computer program product comprising:

a computer readable medium for carrying computer program code means for implementing said method; and said computer program code means comprising:

code means for accessing through the client system a server system which contains a graphical user interface comprising interactive user instructions for adjustment of a picture on the television monitor;

code means for downloading the interactive user instructions from the server system for display on the television monitor; and code means for utilizing the electronic unit to activate one or more of the displayed interactive user instructions which then instruct the user as to how to adjust the picture on the television monitor as to one or more selected characteristics of the picture, such that the user can thereafter use the television monitor to adjust the one or more selected characteristics of the picture on the television monitor in accordance with the one or more activated interactive user instructions.

10. A computer program product according to claim 9, wherein the computer program code means further comprises code means for displaying a test pattern on the television monitor, said test pattern containing an attribute corresponding to at least one display characteristic of the picture.

11. A computer program product according to claim 10, wherein said test pattern is included in a Hypertext Mark-up Language object.

12. A computer program product according to claim 11, wherein said test pattern is a Graphical Interchange File format encoded object.

13. A computer program product according to claim 11, wherein said test pattern is a Joint Photographic Expert Group format encoded object.

14. A computer program product according to claim 11, wherein said test pattern is a bit-mapped object.

15. A computer program product according to claim 9, wherein the one or more activated interactive user instructions indicate that the user is to adjust the contrast of the television monitor until a reference test pattern displayed on the television monitor exhibits a desired contrast attribute.

16. A computer program product according to claim 9, wherein the one or more activated interactive user instructions indicate that the user is to adjust the brightness of the television monitor until a reference test pattern displayed on the television monitor exhibits a desired brightness attribute.

17. A computer program product according to claim 9, wherein the one or more activated interactive user instructions indicate that the user is to adjust the sharpness of the television monitor until a reference test pattern displayed on the television monitor exhibits a desired sharpness attribute.

18. A computer program product according to claim 9, wherein the one or more activated interactive user instructions indicate that the user is to adjust the color of the television monitor until a reference test pattern displayed on the television monitor exhibits a desired color attribute.

19. A computer program product according to claim 9, wherein the one or more activated interactive user instructions indicate that the user is to adjust the hue of the television monitor until a reference test pattern displayed on the television monitor exhibits a desired hue attribute.

20. In a networked computer system which includes a plurality of server systems each of which is connected to a network infrastructure which provides access to a plurality of sites, each site including one or more pages containing text or graphics, and the networked computer system including at least one client system which is connected either directly or logically to one or more of said server systems, and each client system comprising a conventional television monitor on which to display said one or more pages of an accessed site, and an electronic unit for controlling said television monitor in order to provide a user of the client system wild a graphical user interface by which the user can browse said sites or otherwise access said network infrastructure, a computer program product for use by at least one of said server systems to implement a method for interactively prompting a user as to the proper adjustment of the television monitor in order to optimize display of a page accessed at one of said sites, the computer program product comprising:

a computer readable medium for carrying computer program code means for implementing said method; and said computer program code means comprising:

code means for responding to a request for access from a client system to a graphical user interface comprising interactive user instructions for adjustment of a picture on the television monitor; and code means for downloading the interactive user instructions from the at least one server system to the television monitor of the client system, wherein the downloaded interactive user instructions are to be displayed on the television monitor of the client system.

21. A computer program product according to claim 20, wherein the downloaded interactive user instructions indicate to a user how to adjust one or more selected characteristics of the picture, wherein the one or more selected characteristics comprise a display characteristic selected from the group consisting of contrast, brightness, sharpness, color and hue.

22. A computer program product according to claim 20, wherein the code means for downloading the interactive user instructions further comprises code means for downloading a test pattern to be displayed on the television monitor of the client system, said test pattern containing an attribute corresponding to at least one of the one or more selected characteristics of the picture.

* * * * *

UNITED STATES PATENT AND TRADEMARK OFFICE
CERTIFICATE OF CORRECTION

PATENT NO. : 6,008,836
DATED : December 28, 1999
INVENTOR(S) : Timo A. Bruck, Bruce A. Leak, Steven C. Wasserman It is certified that error appears in the above-identified patent and that said Letters Patent is hereby corrected as shown below:

Column 1,
Line 49, after "must often" change "tune" to -- tunes --

Column 7,
Line 6, after "by typing" delete [the typing]
Line 19, after "Screen" and before "hypertext" delete [25]
Line 31, after, "brightness, " and before "sharpness" insert -- and --

Column 8,
Line 8, after "the scale," and before "the" delete [the of]

Column 10,
Line 44, before "system." delete [M]

Column 11,
Line 55, after "of the" and before "test" delete [a]

Column 12,
Line 43, after "could" and before "programmed" insert -- be --

UNITED STATES PATENT AND TRADEMARK OFFICE
CERTIFICATE OF CORRECTION

PATENT NO. : 6,008,836
DATED : December 28, 1999
INVENTOR(S) : Timo A. Bruck, Bruce A. Leak, Steven C. Wasserman It is certified that error appears in the above-identified patent and that said Letters Patent is hereby corrected as shown below:

Column 14,
Line 8, after "to the" change "stop" to -- step --
Line 48, after "attribute, the" change "stop" to -- step --

Column 16,
Line 23, after "system" change "wild" to -- with --

Signed and Sealed this

Ninth Day of October, 2001

*Attest:*

NICHOLAS P. GODICI
*Attesting Officer*  Acting Director of the United States Patent and Trademark Office